(12) United States Patent
MirzaMoghadam et al.

(10) Patent No.: US 11,143,048 B2
(45) Date of Patent: Oct. 12, 2021

(54) LABYRINTH SEAL WITH VARIABLE TOOTH HEIGHTS

(71) Applicant: HONEYWELL INTERNATIONAL INC., Morris Plains, NJ (US)

(72) Inventors: Alexander MirzaMoghadam, Phoenix, AZ (US); Hasham Hamzamiyan Chougule, Mumbai (IN); Abhay Naik, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 16/750,636

(22) Filed: Jan. 23, 2020

(65) Prior Publication Data
US 2020/0157960 A1   May 21, 2020

Related U.S. Application Data

(63) Continuation of application No. 15/819,473, filed on Nov. 21, 2017, now Pat. No. 10,598,038.

(51) Int. Cl.
*F01D 11/02* (2006.01)
*F01D 11/12* (2006.01)
(Continued)

(52) U.S. Cl.
CPC ............ *F01D 11/02* (2013.01); *F01D 11/122* (2013.01); *F16J 15/4472* (2013.01); *F01D 5/02* (2013.01);
(Continued)

(58) Field of Classification Search
CPC ....... F01D 11/02; F01D 11/122; F16J 15/444; F16J 15/4472; F05D 2240/55
See application file for complete search history.

(56) References Cited

U.S. PATENT DOCUMENTS 3,940,153 A    2/1976  Stocker
3,989,410 A   11/1976  Ferrari
(Continued)

FOREIGN PATENT DOCUMENTS

| EP | 2653665 A2 | 10/2013 |
|----|------------|---------|
| EP | 3168427 A1 | 5/2017  |
| WO | 2016059348 A1 | 4/2016 |

OTHER PUBLICATIONS

Stocker, H.L., et al.; Aerodynamic Performance of Conventional and Advanced Design Labyrinth Seals with Solid-Smooth, Abradable, and Honeycomb Lands; Detroit Diesel Allison, Division of GMC, Indianapolis, IN; prepared for NASA, Contract NAS 3-20056; Nov. 1977.

*Primary Examiner* — Nicholas L Foster
(74) *Attorney, Agent, or Firm* — Lorenz & Kopf, LLP

(57) ABSTRACT

A labyrinth seal for a gas turbine engine is provided. The labyrinth seal includes a stator and a rotor spaced apart from the stator. The rotor includes a first tooth at a first side having a first radial height, and a second tooth between the first tooth and a second side. The second tooth has a second radial height that is less than the first radial height. The rotor includes a third tooth between the first tooth and the second side having a third radial height that is substantially the same as the first radial height. A first clearance between a first tip of the first tooth and the stator is different than a second clearance between a second tip of the second tooth and the stator, and a third clearance between a third tip of the third tooth and the stator is substantially the same as the first clearance.

12 Claims, 11 Drawing Sheets

(51) Int. Cl.
   *F16J 15/447*   (2006.01)
   *F01D 5/02*     (2006.01)
   *F01D 9/02*     (2006.01)

(52) U.S. Cl.
   CPC ............ *F01D 9/02* (2013.01); *F05D 2220/32* (2013.01); *F05D 2240/55* (2013.01); *F05D 2250/18* (2013.01)

(56) References Cited

U.S. PATENT DOCUMENTS

| | | |
|---|---|---|
| 4,320,903 A | 3/1982 | Ayache et al. |
| 5,143,383 A | 9/1992 | Glynn et al. |
| 5,224,713 A | 7/1993 | Pope |
| 5,639,095 A | 6/1997 | Rhode |
| 5,967,746 A | 10/1999 | Hagi et al. |
| 6,027,121 A | 2/2000 | Cromer et al. |
| 6,547,522 B2 | 4/2003 | Turnquist et al. |
| 7,704,041 B2 | 4/2010 | Adis |
| 8,128,351 B2 | 3/2012 | Narita et al. |
| 8,240,675 B2 | 8/2012 | Hirakawa et al. |
| 8,360,712 B2 | 1/2013 | Deo et al. |
| 8,500,397 B2 | 8/2013 | Narita et al. |
| 9,181,817 B2 | 11/2015 | Deo et al. |
| 9,995,164 B2 * | 6/2018 | Nishijima ................ F01D 5/20 |
| 10,006,292 B2 | 6/2018 | Kuwamura et al. |
| 10,598,038 B2 * | 3/2020 | MirzaMoghadam ..... F01D 5/02 |
| 2002/0192074 A1 | 12/2002 | Turnquist et al. |
| 2003/0107181 A1 | 6/2003 | Wieghardt |
| 2007/0258826 A1 | 11/2007 | Bracken et al. |
| 2009/0072487 A1 | 3/2009 | Chougule et al. |
| 2009/0072488 A1 | 3/2009 | Ramerth et al. |
| 2011/0309585 A1 | 12/2011 | Uehara et al. |
| 2013/0017072 A1 | 1/2013 | Ali et al. |
| 2014/0064909 A1 | 3/2014 | Trivedi et al. |
| 2014/0119901 A1 | 5/2014 | Shibata |
| 2015/0369075 A1 | 12/2015 | Nishijima et al. |
| 2016/0130965 A1 | 5/2016 | Yamaguchi et al. |
| 2017/0130601 A1 | 5/2017 | Coutandin |
| 2018/0087669 A1 | 3/2018 | Saha et al. |
| 2019/0153884 A1 * | 5/2019 | MirzaMoghadam ........................ F01D 11/122 |

* cited by examiner

LABYRINTH SEAL WITH VARIABLE TOOTH HEIGHTS

CROSS-REFERENCE TO RELATED APPLICATION

This application is a continuation of U.S. patent application Ser. No. 15/819,473 filed on Nov. 21, 2017. The relevant disclosure of the above application is incorporated herein by reference.

TECHNICAL FIELD

The present disclosure generally relates to gas turbine engines, and more particularly relates to a labyrinth seal with variable tooth heights to control fluid leakage between a rotating and a stationary component associated with a gas turbine engine.

BACKGROUND

Gas turbine engines may be employed to power various devices. For example, a gas turbine engine may be employed to power a mobile platform, such as an aircraft. Typically, gas turbine engines include one or more rotating components, such as spools or shafts, which rotate relative to one or more stationary components. Often times, these shafts rotate in or adjacent to different pressurized zones within the gas turbine engine. In these situations, it is desirable to employ one or more seals about the rotating component to control fluid leakage between the different pressurized zones.

In certain instances, a labyrinth seal may be employed between the rotating component and the stationary component to control the fluid leakage between the different pressurized zones. Over time, during the operation of the gas turbine engine, contact between the rotating component and the stationary component may cause deterioration in a portion of the labyrinth seal, which may result in unacceptable fluid leakage that reduces the operating efficiency of the gas turbine engine. Moreover, during start up and shutdown of the gas turbine engine, thermal and mechanical expansion between the stationary component and the rotating component may result in deterioration of the portion of the labyrinth seal, which may also result in unacceptable fluid leakage.

Accordingly, it is desirable to provide a labyrinth seal for a gas turbine engine, which include variable tooth heights that provide for improved leakage control throughout the operation of the gas turbine engine, including during the deterioration of the portion of the labyrinth seal. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a labyrinth seal for a gas turbine engine. The labyrinth seal includes a stator coupled to a non-rotating portion of the gas turbine engine and fixed in an axial direction and a radial direction. The stator includes a layer of abradable material extending uniformly in the axial direction from a first stator side to an opposite second stator side. The labyrinth seal includes a rotor coupled to a rotating portion of the gas turbine engine so as to be spaced apart from the stator in the radial direction. The rotor has a first side adapted to receive a fluid flow and an opposite second side. The rotor includes a first tooth at the first side having a first radial height, and a second tooth between the first tooth and the second side. The second tooth has a second radial height that is different than the first radial height. The rotor includes a third tooth between the first tooth and the second side having a third radial height that is substantially the same as the first radial height. A first clearance between a first tip of the first tooth and the stator in the radial direction is different than a second clearance between a second tip of the second tooth and the stator in the radial direction. A third clearance between a third tip of the third tooth and the stator in the radial direction is substantially the same as the first clearance.

Also provided is a labyrinth seal for a gas turbine engine. The labyrinth seal includes a stator coupled to a non-rotating portion of the gas turbine engine and fixed in an axial direction and a radial direction. The stator includes a layer of abradable material extending uniformly in the axial direction from a first stator side to an opposite second stator side. The labyrinth seal includes a rotor coupled to a rotating portion of the gas turbine engine so as to be spaced apart from the stator in the radial direction. The rotor has a first side adapted to receive a fluid flow and an opposite second side. The rotor includes a first tooth at the first side having a first radial height, and a second tooth between the first tooth and the second side. The second tooth has a second radial height that is greater than the first radial height. The rotor includes a third tooth between the first tooth and the second side having a third radial height that is substantially the same as the first radial height. A first clearance between a first tip of the first tooth and the stator in the radial direction is greater than a second clearance between a second tip of the second tooth and the stator in the radial direction. A third clearance between a third tip of the third tooth and the stator in the radial direction is substantially the same as the first clearance.

Further provided is a labyrinth seal for a gas turbine engine. The labyrinth seal includes a stator coupled to a non-rotating portion of the gas turbine engine and fixed in an axial direction and a radial direction. The stator includes a layer of abradable material extending uniformly in the axial direction from a first stator side to an opposite second stator side. The labyrinth seal includes a rotor coupled to a rotating portion of the gas turbine engine so as to be spaced apart from the stator in the radial direction. The rotor has a first side adapted to receive a fluid flow and an opposite second side. The rotor includes a first tooth at the first side having a first radial height, and a second tooth between the first tooth and a third tooth. The second tooth has a second radial height that is greater than the first radial height. The third tooth is between the second tooth and a fourth tooth. The third tooth has a third radial height that is substantially the same as the first radial height. A first clearance between a first tip of the first tooth and the stator in the radial direction is greater than a second clearance between a second tip of the second tooth and the stator in the radial direction. A third clearance between a third tip of the third tooth and the stator in the radial direction is substantially the same as the first clearance.

Further provided is a labyrinth seal for a gas turbine engine. The labyrinth seal includes a stator coupled to a non-rotating portion of the gas turbine engine and fixed in an axial direction and a radial direction. The stator includes a layer of abradable material extending uniformly in the axial direction from a first stator side to an opposite second stator side. The labyrinth seal includes a rotor coupled to a rotating portion of the gas turbine engine so as to be spaced apart from the stator in the radial direction. The rotor has a first side adapted to receive a fluid flow and an opposite second side. The rotor includes a first tooth at the first side having a first radial height, and a second tooth between the first tooth and the second side. The second tooth has a second radial height that is less than the first radial height. A third tooth is between the first tooth and the second side and has a third radial height that is substantially the same as the first radial height. A first clearance between a first tip of the first tooth and the stator in the radial direction is different than a second clearance between a second tip of the second tooth and the stator in the radial direction, and a third clearance between a third tip of the third tooth and the stator in the radial direction is substantially the same as the first clearance.

Also provided is a labyrinth seal for a gas turbine engine. The labyrinth seal includes a stator coupled to a non-rotating portion of the gas turbine engine and fixed in an axial direction and a radial direction. The stator includes a layer of abradable material extending uniformly in the axial direction from a first stator side to an opposite second stator side. The labyrinth seal includes a rotor coupled to a rotating portion of the gas turbine engine so as to be spaced apart from the stator in the radial direction. The rotor has a first side adapted to receive a fluid flow and an opposite second side. The rotor includes a first tooth at the first side having a first radial height, and a second tooth between the first tooth and the second side. The second tooth has a second radial height that is less than the first radial height. A third tooth is between the first tooth and the second side and has a third radial height that is substantially the same as the first radial height. The third tooth is between a fourth tooth and the second side. The fourth tooth has a fourth radial height that is substantially the same as the second radial height, with a first clearance between a first tip of the first tooth and the stator in the radial direction different than a second clearance between a second tip of the second tooth and the stator in the radial direction, a third clearance between a third tip of the third tooth and the stator in the radial direction is substantially the same as the first clearance, and a fourth clearance between a fourth tip of the fourth tooth and the stator is substantially the same as the second clearance.

Further provided is a labyrinth seal for a gas turbine engine. The labyrinth seal includes a stator coupled to a non-rotating portion of the gas turbine engine and fixed in an axial direction and a radial direction. The stator includes a layer of abradable material extending uniformly in the axial direction from a first stator side to an opposite second stator side. The labyrinth seal includes a rotor coupled to a rotating portion of the gas turbine engine so as to be spaced apart from the stator in the radial direction. The rotor has a first side adapted to receive a fluid flow and an opposite second side. The rotor includes a first tooth at the first side having a first radial height, and a second tooth between the first tooth and the second side. The second tooth has a second radial height that is less than the first radial height. A third tooth is between the first tooth and the second side and has a third radial height that is substantially the same as the first radial height. Third tooth is between the second tooth and a fourth tooth. The fourth tooth has a fourth radial height that is substantially the same as the second radial height with a first clearance between a first tip of the first tooth and the stator in the radial direction different than a second clearance between a second tip of the second tooth and the stator in the radial direction, a third clearance between a third tip of the third tooth and the stator in the radial direction is substantially the same as the first clearance, and a fourth clearance between a fourth tip of the fourth tooth and the stator is substantially the same as the second clearance.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
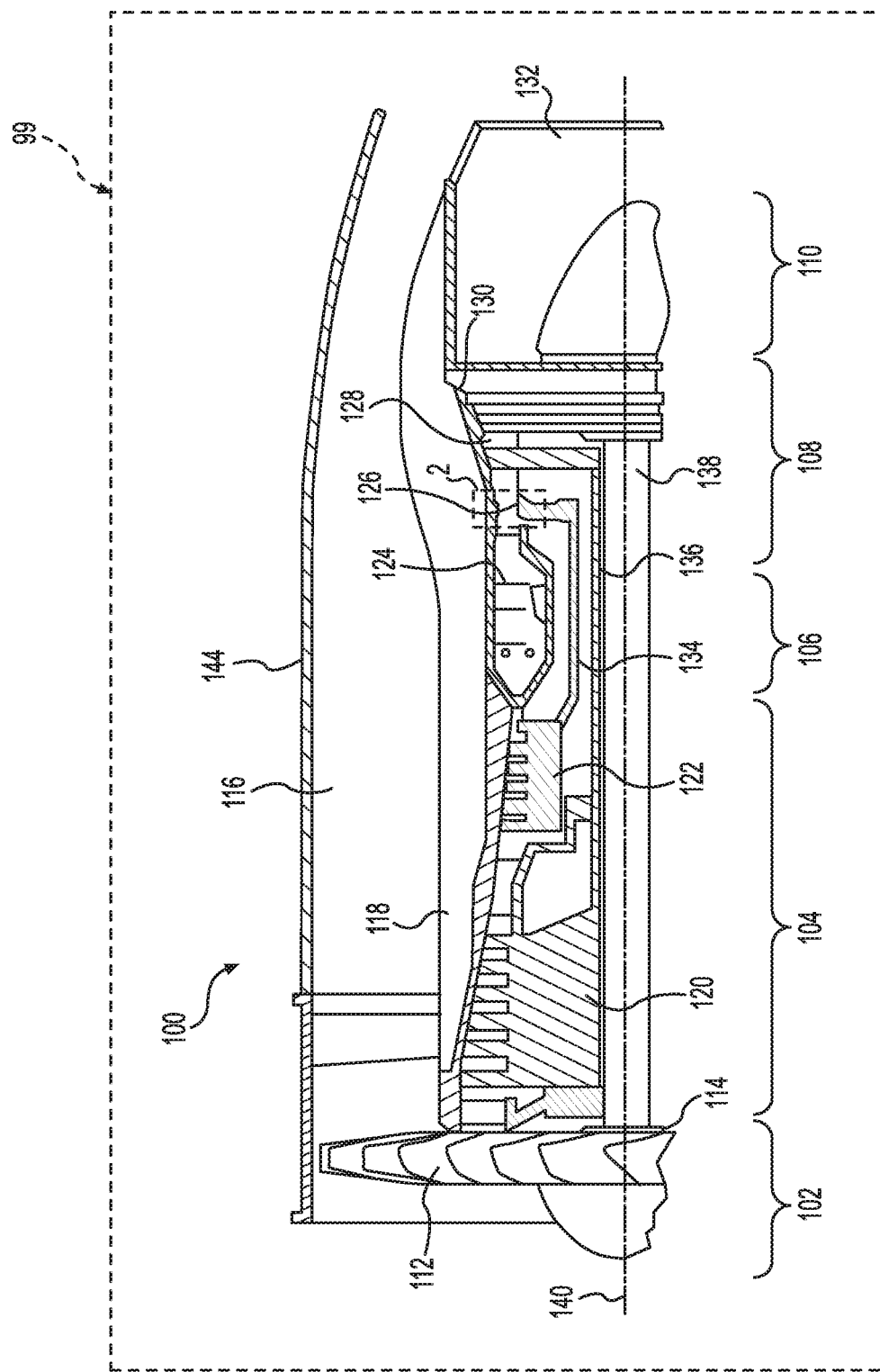
FIG. 1 is a schematic cross-sectional illustration of a gas turbine engine, which includes an exemplary labyrinth seal with a variable tooth heights in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of device that would benefit from a reduced fluid leakage between pressurized zones, and that the labyrinth seals described herein for use with a gas turbine engine is merely one exemplary embodiment according to the present disclosure.

Moreover, while the labyrinth seals are described herein as being used with a gas turbine engine onboard a mobile platform, such as a bus, motorcycle, train, motor vehicle, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominately in the respective nominal axial or radial direction. As used herein, the term "transverse" denotes an axis that crosses another axis at an angle such that the axis and the other axis are neither substantially perpendicular nor substantially parallel.

With reference to FIG. 1, a partial, cross-sectional view of an exemplary gas turbine engine 100 is shown with the remaining portion of the gas turbine engine 100 being axisymmetric about a longitudinal axis 140, which also comprises an axis of rotation for the gas turbine engine 100. In the depicted embodiment, the gas turbine engine 100 is an annular multi-spool turbofan gas turbine jet engine within an aircraft 99, although other arrangements and uses may be provided. As will be discussed herein, one or more spools or shafts of the gas turbine engine 100 include a labyrinth seal 200 (FIG. 2) that has varied teeth heights for improved fluid leakage control. By providing the labyrinth seal 200 (FIG. 2) with varied teeth height, at least one tooth with a reduced height may define a gap between a stator and the respective tooth in instances where one or more of the teeth has contacted the stator and resulted in a deformation of a portion of the stator. This controls and reduces a fluid leakage along the labyrinth seal even during a wear or deterioration of the abradable portion of the labyrinth seal 200 (FIG. 2).

In this example, the gas turbine engine 100 includes fan section 102, a compressor section 104, a combustor section 106, a turbine section 108, and an exhaust section 110. The fan section 102 includes a fan 112 mounted on a rotor 114 that draws air into the gas turbine engine 100 and accelerates it. A fraction of the accelerated air exhausted from the fan 112 is directed through an outer (or first) bypass duct 116 and the remaining fraction of air exhausted from the fan 112 is directed into the compressor section 104. The outer bypass duct 116 is generally defined by an inner casing 118 and an outer casing 144. In the embodiment of FIG. 1, the compressor section 104 includes an intermediate pressure compressor 120 and a high pressure compressor 122. However, in other embodiments, the number of compressors in the compressor section 104 may vary. In the depicted embodiment, the intermediate pressure compressor 120 and the high pressure compressor 122 sequentially raise the pressure of the air and direct a majority of the high pressure air into the combustor section 106. A fraction of the compressed air bypasses the combustor section 106 and is used to cool, among other components, turbine blades in the turbine section 108 via an inner bypass duct.

In the embodiment of FIG. 1, in the combustor section 106, which includes a combustion chamber 124, the high pressure air is mixed with fuel and combusted. The high-temperature combusted air is directed into the turbine section 108. In this example, the turbine section 108 includes three turbines disposed in axial flow series, namely, a high pressure turbine 126, an intermediate pressure turbine 128, and a low pressure turbine 130. However, it will be appreciated that the number of turbines, and/or the configurations thereof, may vary. In this embodiment, the high-temperature combusted air from the combustor section 106 expands through and rotates each turbine 126, 128, and 130. As the turbines 126, 128, and 130 rotate, each drives equipment in the gas turbine engine 100 via concentrically disposed shafts or spools. In one example, the high pressure turbine 126 drives the high pressure compressor 122 via a high pressure shaft 134, the intermediate pressure turbine 128 drives the intermediate pressure compressor 120 via an intermediate pressure shaft 136, and the low pressure turbine 130 drives the fan 112 via a low pressure shaft 138.

Figure 2:
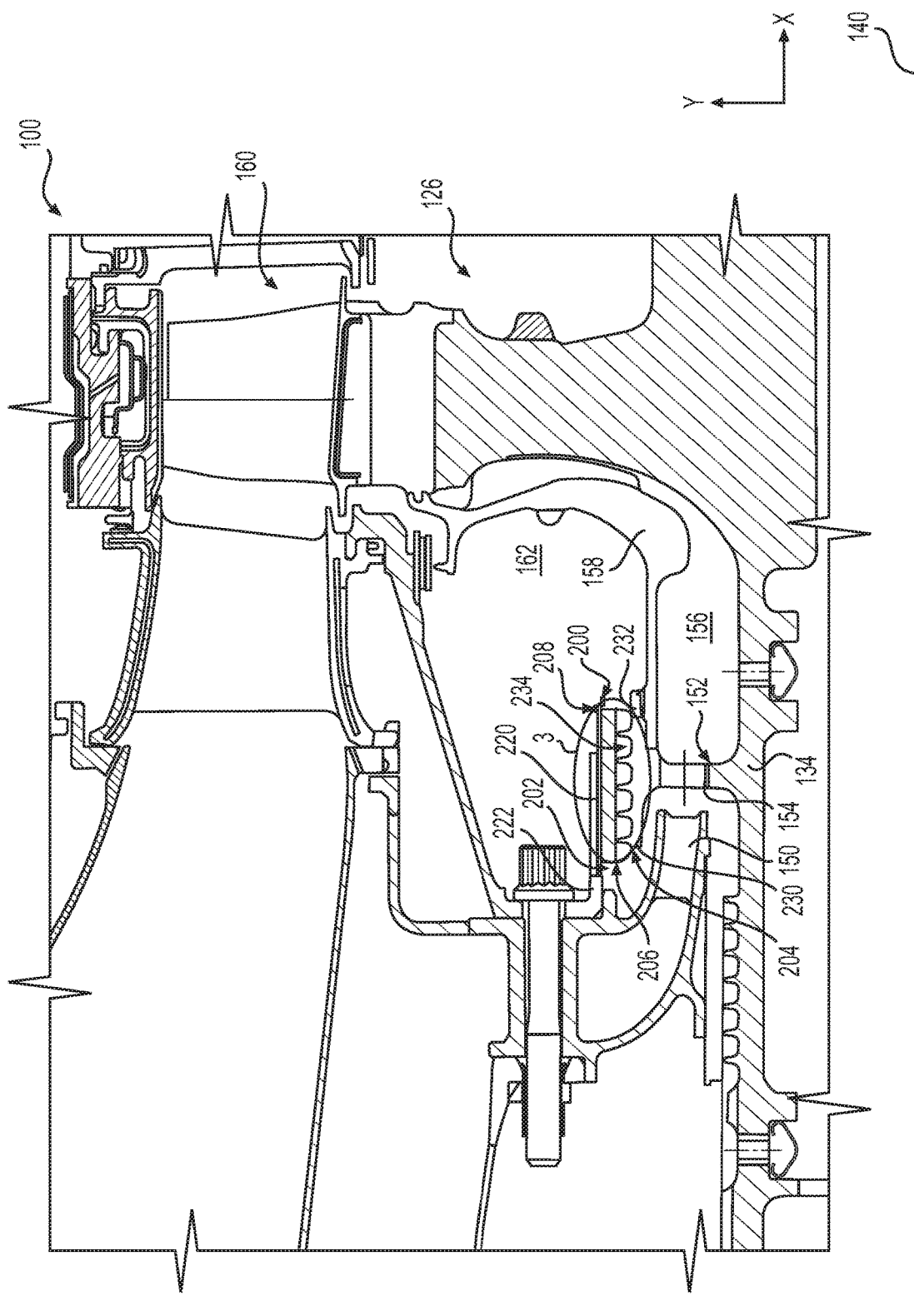
FIG. 2 is a detail cross-sectional view of the gas turbine engine of FIG. 1, taken at 2 of FIG. 1, which illustrates a rotor of the labyrinth seal coupled to a rotating portion of a high pressure shaft and a stator of the labyrinth seal coupled to a non-rotating portion of the gas turbine engine in accordance with various embodiments.

With reference to FIG. 2, a portion of the high pressure turbine 126 of the gas turbine engine 100 of FIG. 1 is shown in greater detail. In this example, the labyrinth seal 200 is employed to control or reduce fluid leakage between the high pressure turbine 126 and a cooling fluid duct 150, which have different pressures. It should be noted that while the labyrinth seal 200 is illustrated herein as being used with the high pressure turbine 126 of the gas turbine engine 100, which can be included with an auxiliary power unit, the labyrinth seal 200 can be employed with various types of engines, including, but not limited to, turbofan, turboprop, turboshaft, and turbojet engines, whether deployed onboard an aircraft, watercraft, or ground vehicle (e.g., a tank), included within industrial power generators, or utilized within another platform or application.

In the example of FIG. 2, the labyrinth seal 200 is coupled to the high pressure shaft 134, which is driven or rotated by the high pressure turbine 126. In this example, the labyrinth seal 200 is at least partially defined on a radial extension 152 of the high pressure shaft 134. The radial extension 152 of the high pressure shaft 134 also defines a throughbore 154, which enables fluid communication between the cooling fluid duct 150 and a cooling fluid plenum 156. A face seal plate 158 is coupled to the radial extension 152 and defines the cooling fluid plenum 156. Generally, the cooling fluid duct 150 is in fluid communication with the inner bypass duct to receive cooling fluid, which is directed through the cooling fluid duct 150, through the throughbore 154 and into the cooling fluid plenum 156 to cool turbine blades 160 associated with the high pressure turbine 126. The labyrinth seal 200 controls leakage of the cooling fluid from the cooling fluid duct 150 into a high pressure turbine forward cavity 162. The high pressure turbine forward cavity 162 is downstream from the labyrinth seal 200 and upstream from the face seal plate 158 and the high pressure turbine 126. It should be understood that the labyrinth seal 200 is axisymmetric about the longitudinal axis 140 or axis of rotation of the gas turbine engine 100 (FIG. 2).

Figure 3:
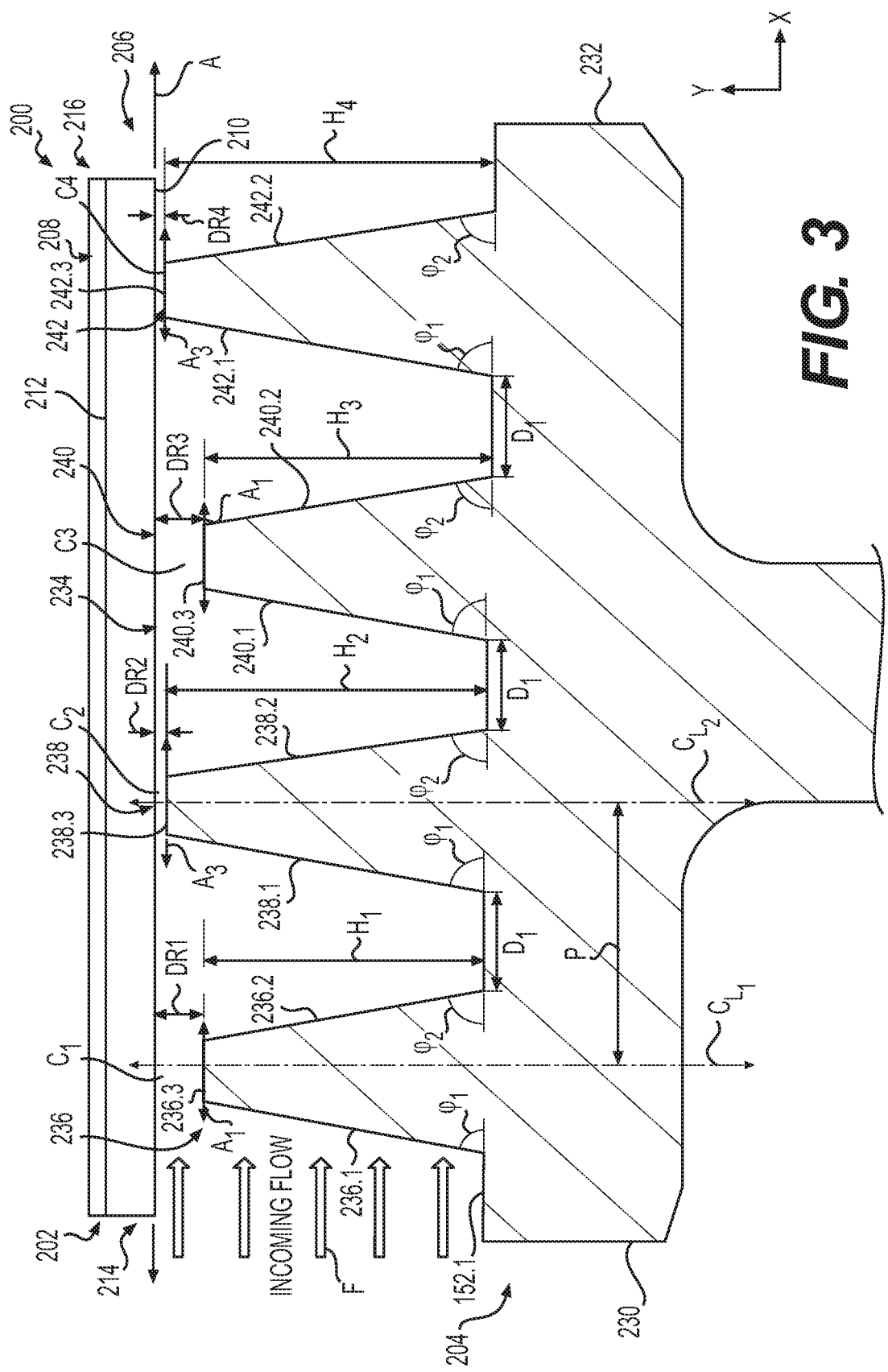
FIG. 3 is a detail cross-sectional view of the labyrinth seal of FIG. 2, taken at 3 on FIG. 2, which illustrates the variable tooth heights in accordance with one embodiment.

With reference to FIG. 3, the labyrinth seal 200 is shown in greater detail. The labyrinth seal 200 includes a stator 202 and a rotor 204. The stator 202 and the rotor 204 cooperate to control or reduce fluid leakage. The stator 202 includes a land 206 and a stator base 208. The land 206 is an abradable layer and is responsive to contact received from the rotor 204 to wear or deteriorate in response to the contact. Thus, the land 206 is a layer of contact absorbing material. In one example, the land 206 is a honeycomb layer of metal or metal alloy, which is coupled to the stator base 208. For example, the land 206 comprises the land 108 of commonly assigned U.S. application Ser. No. 11/857,072, filed Sep. 18, 2007, titled "Labyrinth Seals and Methods of Manufacture" (U.S. Pub. No. 2009/0072488) to Douglas Lyle Ramerth, et. al., the relevant portion of which is incorporated herein by reference. Thus, in this example, the land 206 is a plurality of corrugated strips of metal foil, which are arranged to form first and second halves of a hexagon. The corrugated strips of metal foil may be joined together at braze joints to form the hexagon, and this process may be repeated to form the honeycomb material. In other embodiments, the land 206 may be formed from additive manufacturing.

The land 206 is coupled to the stator base 208. In one example, the land 206 is coupled to the stator base 208 via braze joints; however, the land 206 may be coupled to the stator base 208 via any desired technique. The land 206 is coupled to the stator base 208 so as to extend substantially uniformly in an axial direction X (relative to the longitudinal axis 140 or axis of rotation of the gas turbine engine 100 (FIG. 2)). Stated another way, the land 206 has a first surface 210 and an opposite second surface 212. The first surface 210 extends along an axis A, which is substantially parallel to the longitudinal axis 140 or axis of rotation (FIG. 2) of the gas turbine engine 100. In this example, the second surface 212 also extends along an axis that is substantially parallel to the axis A and the longitudinal axis 140 or axis of rotation of the gas turbine engine 100. The first surface 210 and the second surface 212 each extend from a first stator side 214 of the stator base 208 to an opposite second stator side 216 of the stator base 208.

The stator base 208 includes the first stator side 214 opposite the second stator side 216 and a first stator surface 218 opposite a second stator surface 220. The first stator surface 218 is coupled to the second surface 212 of the land 206, and the second stator surface 220 is coupled to a portion of the gas turbine engine 100 (FIG. 2). With reference to FIG. 2, in one example, the second stator surface 220 is coupled to an annular flange 222. The annular flange 222 is fixedly coupled to a portion of the gas turbine engine 100, such as a strut, such that the annular flange 222 is fixed in the axial direction X and a radial direction Y. Thus, the annular flange 222 is a non-rotating portion of the gas turbine engine 100. The second stator surface 220 is coupled to the annular flange 222 so as to be fixed in the axial direction X and the radial direction Y. In one example, the second stator surface 220 is coupled to the annular flange 222 by welding; however, the second stator surface 220 may be coupled to the annular flange 222 by mechanical fasteners, adhesives, etc. Moreover, in certain embodiments, the stator base 208 may be integrally formed with the annular flange 222, if desired.

With continued reference to FIG. 2, the rotor 204 is coupled to a rotating portion of the gas turbine engine 100, and in this example, is coupled to the radial extension 152 of the high pressure shaft 134. The rotor 204 is coupled to the radial extension 152 of the high pressure shaft 134 so as to be spaced apart from the stator 202 in the radial direction Y. The rotor 204 has a first rotor side 230 and an opposite second rotor side 232. The first rotor side 230 is in communication with or receives a flow of cooling fluid F from the cooling fluid duct 150. The second rotor side 232 is downstream from the first rotor side 230. In one example, the rotor 204 includes a plurality of teeth 234. In this example, the plurality of teeth 234 are each defined on or integrally formed with the rotor 204; however, in other embodiments, the plurality of teeth 234 may be separately formed, for example, as a sleeve, which is positioned about the radial extension 152 of the high pressure shaft 134 and fixedly coupled to the radial extension 152 so as to rotate with the radial extension 152. The plurality of teeth 234 extend substantially from the first rotor side 230 to the second rotor side 232.

With reference to FIG. 3, the plurality of teeth 234 are shown in greater detail. In this example, the plurality of teeth 234 comprise four teeth 236-242, which are spaced apart along the rotor 204 from the first rotor side 230 to the second rotor side 232. Each tooth 236-242 is integrally formed with the radial extension 152, and thus, may comprise the same metal or metal alloy as the high pressure shaft 134. In one example, each tooth 236-242 is formed by forging each tooth 236-242 on the radial extension 152 of the high pressure shaft 134. In this example, the first tooth 236 is upstream from the remaining teeth 238-242, and is the first to contact the incoming cooling fluid F from the cooling fluid duct 150. The first tooth 236 has a first side 236.1, a second side 236.2 and a third side or a first tip 236.3. The first side 236.1 is opposite the second side 236.2, and the first tip 236.3 interconnects the first side 236.1 and the second side 236.2. It should be noted that the first tip 236.3 may interconnect the first side 236.1 and the second side 236.2 via one or more rounded edges. The first side 236.1 is in fluid communication with the incoming cooling fluid F. The first side 236.1 extends upwardly from a surface 152.1 of the radial extension 152 at an angle $\varphi 1$. In this example, $\varphi 1$ is generally less than or equal to 90 degrees, and in this example, $\varphi 1$ ranges from about 60 degrees to about 85 degrees. The second side 236.2 is adjacent to or next to the second tooth 238. The second side 236.2 may be spaced apart from the second tooth 238 along the surface 152.1 of the radial extension 152 by a first distance D1. In one example, the first distance D1 is about 10% to about 90% of a pitch P of the plurality of teeth 234. Generally, the pitch P is a distance between a centerline of one tip of one of the plurality of teeth 234 and a centerline of another tip of an adjacent one of the plurality of teeth 234. As shown in FIG. 3, the pitch P is defined between a centerline CL1 of the first tip 236.3 and a centerline CL2 of a second tip 238.3 of the second tooth 238. It should be noted that a pitch between a centerline of the second tip 238.3 and a centerline of a third tip 240.3 of the third tooth 240 and a pitch between a centerline of the third tip 240.3 and a centerline of a fourth tip 242.3 of the fourth tooth 242 in this example, is substantially the same as the pitch P between the centerline CL1 of the first tip 236.3 and the centerline CL2 of the second tip 238.3 of the second tooth 238. Stated another way, in this example, each tooth of the plurality of teeth 234 are separated by the substantially same pitch P. In one example, the pitch P ranges from about 0.075 inches (in.) to about 0.3 inches (in.). The second side 236.2 extends upwardly from the surface 152.1 of the radial extension 152 at an angle φ2. In this example, φ2 is generally less than or equal to 90 degrees, and in this example, φ2 ranges from about 60 degrees to about 85 degrees. Thus, in this example, φ2 may be substantially the same as φ1. Each of φ1 and φ2 are included angles between the first side 236.1 and the surface 152.1 and the second side 236.2 and the surface 152.1, respectively.

The first tip 236.3 extends along an axis A1, which is substantially parallel to the axis A of the land 206. In one example, the first tip 236.3 is positioned at a first radial height H1 from the surface 152.1 of the radial extension 152, which is about 0.13 inches to about 0.15 inches, and in one example, is about 0.14 inches. Thus, the first tooth 236 has the first radial height H1. The first radial height H1 is generally selected so that the first tip 236.3 is spaced a first radial distance DR1 apart from the first surface 210 of the land 206. In one example, the first radial distance DR1 is about 0.005 inches to about 0.015 inches, and in this example, is about 0.011 inches. Stated another way, a first clearance C1 is defined between the first tip 236.3 of the first tooth 236 and the first surface 210 of the land 206, and the first clearance C1 is equal to the first radial distance DR1.

The second tooth 238 is upstream from the remaining teeth 240-242, and is downstream from the first tooth 236. The second tooth 238 has a first side 238.1, a second side 238.2 and a third side or second tip 238.3. The first side 238.1 is opposite the second side 238.2, and the second tip 238.3 interconnects the first side 238.1 and the second side 238.2. It should be noted that the second tip 238.3 may interconnect the first side 238.1 and the second side 238.2 via one or more rounded edges. The first side 238.1 is spaced apart from the second side 236.2 of the first tooth 236. The first side 238.1 extends upwardly from the surface 152.1 of the radial extension 152 at the angle φ1. The second side 238.2 is adjacent to or next to the third tooth 240. The second side 238.2 may be spaced apart from the third tooth 240 along the surface 152.1 of the radial extension 152 by the first distance D1. The second side 238.2 extends upwardly from the surface 152.1 of the radial extension 152 at the angle φ2.

The second tip 238.3 extends along an axis A3, which is substantially parallel to the axis A of the land 206. In one example, the second tip 238.3 is positioned at a second radial height H2, which is about 0.15 inches to about 0.17 inches, and in one example, is about 0.15 inches. Thus, the second tooth 238 has the second radial height H2. The second radial height H2 is generally selected so that the second tip 238.3 is spaced a second radial distance DR2 apart from the first surface 210 of the land 206. In one example, the second radial distance DR2 is about 0.0005 inches to about 0.0015 inches, and in this example, is about 0.0010 inches. Stated another way, a second clearance C2 is defined between the second tip 238.3 of the second tooth 238 and the first surface 210 of the land 206, and the second clearance C2 is equal to the second radial distance DR2.

The third tooth 240 is upstream from the fourth tooth 242, and is downstream from the second tooth 238. The third tooth 240 has a first side 240.1, a second side 240.2 and a third side or third tip 240.3. The first side 240.1 is opposite the second side 240.2, and the third tip 240.3 interconnects the first side 240.1 and the second side 240.2. It should be noted that the third tip 240.3 may interconnect the first side 240.1 and the second side 240.2 via one or more rounded edges. The first side 240.1 is spaced apart from the second side 238.2 of the second tooth 238. The first side 240.1 extends upwardly from the surface 152.1 of the radial extension 152 at the angle (p 1. The second side 240.2 is adjacent to or next to the fourth tooth 242. The second side 240.2 may be spaced apart from the fourth tooth 242 along the surface 152.1 of the radial extension 152 by the first distance D1. The second side 240.2 extends upwardly from the surface 152.1 of the radial extension 152 at the angle φ2.

The third tip 240.3 extends along the axis A1. In one example, the third tip 240.3 is positioned at a third radial height H3, which is about 0.13 inches to about 0.15 inches, and in one example, is about 0.14 inches. Thus, in this example, the third radial height H3 is equal to the first radial height H1. Thus, the first tooth 236 and the third tooth 240 have the same radial height. The third radial height H3 is generally selected so that the third side 240.3 is spaced a third radial distance DR3 apart from the first surface 210 of the land 206. In this example, the third radial distance DR3 is about 0.005 inches to about 0.015 inches, and in this example, is about 0.011 inches. Stated another way, a third clearance C3 is defined between the third tip 240.3 of the third tooth 240 and the first surface 210 of the land 206, and the third clearance C3 is equal to the third radial distance DR3. In this example, the third clearance C3 is equal to the first clearance C1, and the third radial distance DR3 is equal to the first radial distance DR1. Thus, the first tooth 236 and the third tooth 240 have substantially the same radial heights and clearances.

The fourth tooth 242 is downstream from the third tooth 240 and is between the third tooth 240 and the second rotor end 232. The fourth tooth 242 has a first side 242.1, a second side 242.2 and a third side or fourth tip 242.3. The first side 242.1 is opposite the second side 242.2, and the fourth tip 242.3 interconnects the first side 242.1 and the second side 242.2. It should be noted that the fourth tip 242.3 may interconnect the first side 242.1 and the second side 242.2 via one or more rounded edges. The first side 242.1 is spaced apart from the second side 240.2 of the third tooth 240. The first side 242.1 extends upwardly from the surface 152.1 of the radial extension 152 at the angle φ1. The second side 242.2 is adjacent to or next to the second rotor end 232. The second side 242.2 extends upwardly from the surface 152.1 of the radial extension 152 at the angle φ2.

The fourth tip 242.3 extends along the axis A3. In one example, the third side 242.3 is positioned at a fourth radial height H4, which is about 0.15 inches to about 0.17 inches, and in one example, is about 0.15 inches. In this example, the fourth radial height H4 is equal to the second radial height H2, and thus, the second tooth 238 and the fourth tooth 242 have the same radial height. The fourth radial height H4 is generally selected so that the fourth tip 242.3 is spaced a fourth radial distance DR4 apart from the first surface 210 of the land 206. In this example, the fourth radial distance DR4 is about 0.0005 inches to about 0.0015 inches, and in this example, is about 0.0010 inches. Stated another way, a fourth clearance C4 is defined between the fourth tip 242.3 of the fourth tooth 242 and the first surface 210 of the land 206, and the fourth clearance C4 is equal to the fourth radial distance DR4. In this example, the fourth clearance C4 is equal to the second clearance C2, and the fourth radial distance DR4 is equal to the second radial distance DR2. Thus, the second tooth 238 and the fourth tooth 242 have the same radial heights and clearances.

Figure 4:
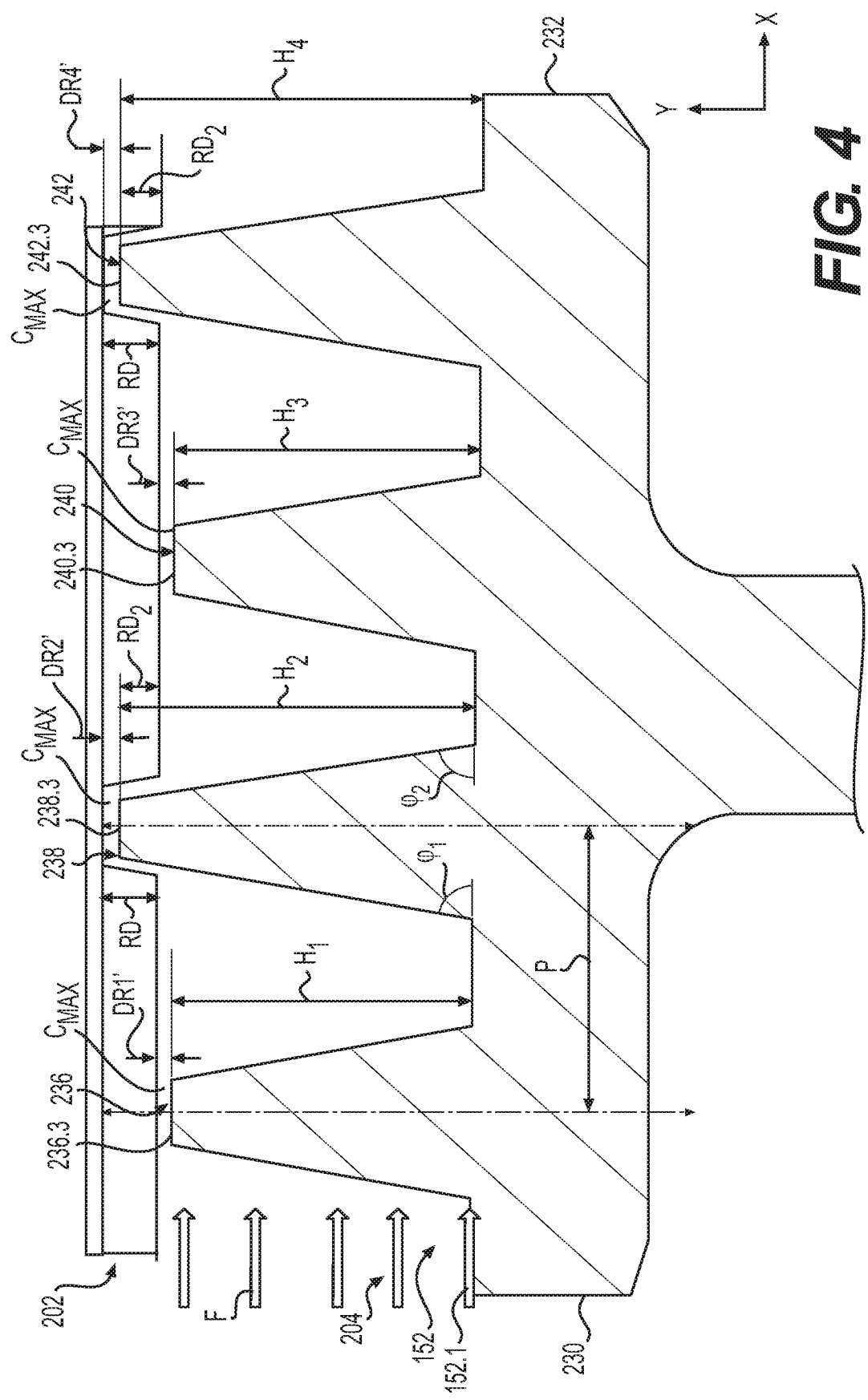
FIG. 4 is a detail cross-sectional view of the labyrinth seal of FIG. 2, taken from the perspective of 3 on FIG. 2, which illustrates the labyrinth seal after one or more teeth of the labyrinth seal has contacted a land of the stator of the labyrinth seal.

As discussed, the first tooth 236 and the third tooth 240 have the same radial heights and clearances; and the second tooth 238 and the fourth tooth 242 have the same radial heights and clearances. In this example, the radial heights H1, H3 are different from the radial heights H2, H4 by about 0.010 inches, which is an expected amount of rub depth RD in the land 206 caused by the contact between the second tooth 238, the fourth tooth 242 and the land 206. In this regard, with reference to FIG. 4, the labyrinth seal 200 is shown with the rub depth RD of about 0.010 inches caused by the contact between the second tooth 238 and the land 206; and the fourth tooth 242 and the land 206. In certain operating conditions of the gas turbine engine 100, such as start-up or shut down, and/or certain operating conditions of the aircraft 10, such as take-off and landing, due to thermal and mechanical expansion, the second tooth 238 and the fourth tooth 242 of the rotor 204 may contact and rub against the land 206.

The continued abrasion or deterioration of the land 206 results in the rub depth RD, which in one example, is about 0.009 inches to about 0.011 inches, and in this example is about 0.010 inches. As the second tooth 238 and the fourth tooth 242 contact and abrade the land 206, the first tooth 236 and the third tooth 240, respectively, define the gap or clearance between the rotor 204 and the land 206. Stated another way, as the land 206 is abraded by the second tooth 238 and the fourth tooth 242, since the second tooth 238 and the fourth tooth 242 have a greater radial height than the first tooth 236 and the third tooth 240, the first tooth 236 and the third tooth 240 define a maximum amount of clearance C max between the stator 202 and the rotor 204 of the labyrinth seal 200 over a working life of the labyrinth seal 200 or the maximum amount of clearance when the labyrinth seal 200 is worn. In one example, C max is a first radial distance DR1', which is about 0.0005 inches to about 0.0015 inches, and in this example, is about 0.001 inches. In this example, a depth RD2 is the rub depth RD minus the maximum amount of clearance C max or about 0.009 inches. Once the rub depth RD is formed in the land 206, during steady state operations, the second tooth 238 and the fourth tooth 242 are also spaced apart from the land 206 by the maximum amount of clearance C max. Thus, a second radial distance DR2' between the second tooth 238 and the land 206; a third radial distance DR3' between the third tooth 240 and the land 206; and a fourth radial distance DR4' between the fourth tooth 242 and the land 206 is the substantially the same as the first radial distance DR1'. By reducing the radial heights of the first tooth 236 and the third tooth 240 and increasing the radial heights H2, H4 of the second tooth 238 and the fourth tooth 242 leakage through the labyrinth seal 200 is reduced over the operating life of the labyrinth seal 200 due to the variation in heights amongst the plurality of teeth 234. In this example, the fourth radial height and the second radial height H2 are each greater than each of the first radial height H1 and the third radial height H3. Generally, the difference in radial heights H1, H3 of the shorter first tooth 236 and third tooth 240 is predetermined based on an expected amount of the rub depth between the taller second tooth 238 and fourth tooth 242. Thus, in this example, the radial heights H1, H3 of the shorter first tooth 236 and third tooth 240 are about 0.010 inches different than the radial heights H2, H4 of the taller second tooth 238 and fourth tooth 242.

It should be noted that the expected amount of rub depth may vary based on the operating conditions associated with the labyrinth seal 200 and/or gas turbine engine 100, and thus, about 0.010 inches as the rub depth is merely exemplary.

Figure 5:
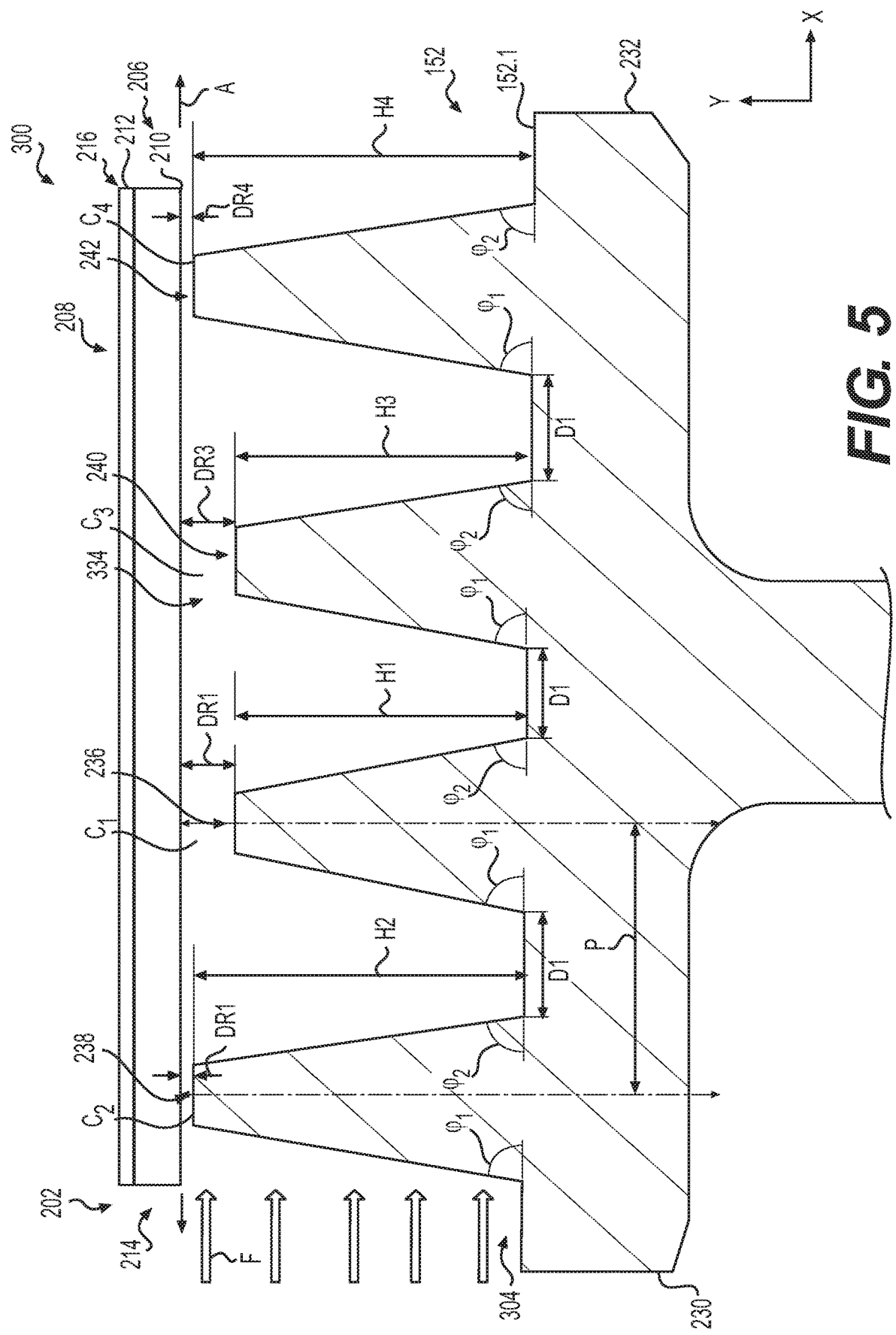
FIG. 5 is a detail cross-sectional view of another exemplary labyrinth seal, taken from the perspective of 3 on FIG. 2, which illustrates variable tooth heights in accordance with another embodiment.

It will be understood that the labyrinth seal 200 described with regard to FIGS. 1-4 may be configured differently to control leakage during the operating life of the labyrinth seal. In one example, with reference to FIG. 5, a labyrinth seal 300 is shown. As the labyrinth seal 300 includes components that are substantially similar to or the same as the labyrinth seal 200 discussed with regard to FIGS. 1-4, the same reference numerals will be used to denote the same or similar features.

The labyrinth seal 300 includes the stator 202 and a rotor 304. The stator 202 and the rotor 304 cooperate to control or reduce fluid leakage. The stator 202 includes the land 206 and the stator base 208. The stator base 208 is coupled to the annular flange 222 (FIG. 2) so as to be fixed in the axial direction X and the radial direction Y. The rotor 304 is coupled to a rotating portion of the gas turbine engine 100, such as the radial extension 152 of the high pressure shaft 134. The rotor 304 is coupled to the radial extension 152 of the high pressure shaft 134 so as to be spaced apart from the stator 202 in the radial direction Y. The rotor 304 has the first rotor side 230 and the opposite second rotor side 232. In one example, the rotor 204 includes a plurality of teeth 334. In this example, the plurality of teeth 334 are each defined on or integrally formed with the rotor 304; however, in other embodiments, the plurality of teeth 334 may be separately formed, for example, as a sleeve, which is positioned about the radial extension 152 of the high pressure shaft 134 and fixedly coupled to the radial extension 152. The plurality of teeth 334 extend from the first rotor side 230 to the second rotor side 232.

In this example, the plurality of teeth 334 comprise the four teeth 236-242, which are spaced apart along the rotor 304 from the first rotor side 230 to the second rotor side 232 by the pitch P and the first distance D1. In this example, the second tooth 238 is upstream from the remaining teeth 236, 240-242, and is the first to contact the incoming fluid F from the cooling fluid duct 150. The first tooth 236 is downstream from the second tooth 238, and upstream from the teeth 240-242. The third tooth 240 is downstream from the first tooth 236, and upstream from the fourth tooth 242. The fourth tooth 242 is downstream from the third tooth 240, and is between the third tooth 240 and the second rotor side 232.

Thus, in this example, the second tooth 238 is between the first rotor side 230 and the first tooth 236. As the second tooth 238 and the fourth tooth 242 contact and abrade the land 206, the first tooth 236 and the third tooth 240, respectively, define the gap or clearance between the rotor 204 and the land 206. Stated another way, as the land 206 is abraded by the second tooth 238 and the fourth tooth 242, since the second tooth 238 and the fourth tooth 242 have a greater radial height than the first tooth 236 and the third tooth 240, the first tooth 236 and the third tooth 240 define the maximum amount of clearance between the stator 202 and the rotor 304 of the labyrinth seal 300 over a working life of the labyrinth seal 300 or the maximum amount of clearance when the labyrinth seal 300 is worn. In this example, the maximum amount of clearance is about 0.0005 inches to about 0.0015 inches, and in this example, is about 0.001 inches. Once the rub depth is formed in the land 206, during steady state operations, the second tooth 238 and the fourth tooth 242 are also spaced apart from the land 206 by the maximum amount of clearance. By reducing the radial heights of the first tooth 236 and the third tooth 240 and increasing the radial heights H2, H4 of the second tooth 238 and the fourth tooth 242 leakage through the labyrinth seal 300 is reduced over the operating life of the labyrinth seal 300 due to the variation in heights amongst the plurality of teeth 334.

Figure 6:
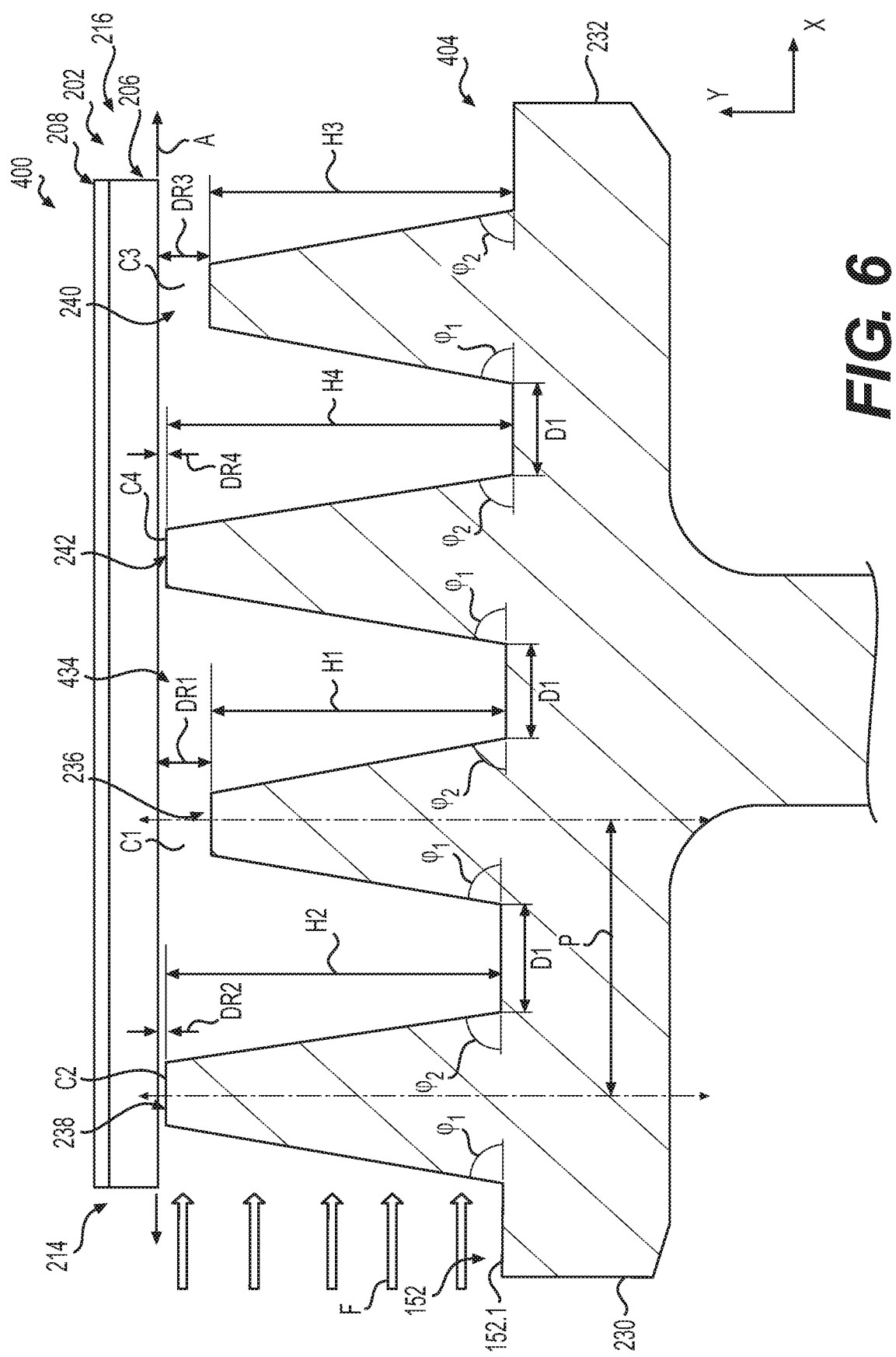
FIG. 6 is a detail cross-sectional view of another exemplary labyrinth seal, taken from the perspective of 3 on FIG. 2, which illustrates variable tooth heights in accordance with another embodiment.

Further, it will be understood that the labyrinth seal 200 described with regard to FIGS. 1-4 may be configured differently to control leakage during the operating life of the labyrinth seal. In one example, with reference to FIG. 6, a labyrinth seal 400 is shown. As the labyrinth seal 400 includes components that are substantially similar to or the same as the labyrinth seal 200 discussed with regard to FIGS. 1-4, the same reference numerals will be used to denote the same or similar features.

The labyrinth seal 400 includes the stator 202 and a rotor 404. The stator 202 and the rotor 404 cooperate to control or reduce fluid leakage. The stator 202 includes the land 206 and the stator base 208. The stator base 208 is coupled to the annular flange 222 (FIG. 2) so as to be fixed in the axial direction X and the radial direction Y. The rotor 404 is coupled to a rotating portion of the gas turbine engine 100, such as the radial extension 152 of the high pressure shaft 134. The rotor 404 is coupled to the radial extension 152 of the high pressure shaft 134 so as to be spaced apart from the stator 202 in the radial direction Y. The rotor 404 has the first rotor side 230 and the opposite second rotor side 232. In one example, the rotor 404 includes a plurality of teeth 434. In this example, the plurality of teeth 434 are each defined on or integrally formed with the rotor 404; however, in other embodiments, the plurality of teeth 434 may be separately formed, for example, as a sleeve, which is positioned about the radial extension 152 of the high pressure shaft 134 and fixedly coupled to the radial extension 152. The plurality of teeth 434 extend from the first rotor side 230 to the second rotor side 232.

In this example, the plurality of teeth 434 comprise the four teeth 236-242, which are spaced apart along the rotor 404 from the first rotor side 230 to the second rotor side 232 by the pitch P and the first distance D1. In this example, the second tooth 238 is upstream from the remaining teeth 236, 240-242, and is the first to contact the incoming cooling fluid F from the cooling fluid duct 150. The first tooth 236 is downstream from the second tooth 238, and upstream from the teeth 240-242. The fourth tooth 242 is downstream from the first tooth 236, and upstream from the third tooth 240. The third tooth 240 is downstream from the fourth tooth 242, and is between the fourth tooth 242 and the second rotor side 232.

Thus, in this example, the second tooth 238 is between the first rotor side 230 and the first tooth 236 and the fourth tooth 242 is between the first tooth 236 and the third tooth 240. The third tooth 240 is between the fourth tooth 242 and the second rotor side 232. As the second tooth 238 and the fourth tooth 242 contact and abrade the land 206, the first tooth 236 and the third tooth 240, respectively, define the gap or clearance between the rotor 204 and the land 206. Stated another way, as the land 206 is abraded by the second tooth 238 and the fourth tooth 242, since the second tooth 238 and the fourth tooth 242 have a greater radial height than the first tooth 236 and the third tooth 240, the first tooth 236 and the third tooth 240 define the maximum amount of clearance between the stator 202 and the rotor 404 of the labyrinth seal 400 during a working life of the labyrinth seal 400 or the maximum amount of clearance when the labyrinth seal 400 is worn. In this example, the maximum amount of clearance is about 0.0005 inches to about 0.0015 inches, and in this example, is about 0.001 inches. Once the rub depth is formed in the land 206, during steady state operations, the second tooth 238 and the fourth tooth 242 are also spaced apart from the land 206 by the maximum amount of clearance. By reducing the radial heights of the first tooth 236 and the third tooth 240 and increasing the radial heights H2, H4 of the second tooth 238 and the fourth tooth 242 leakage through the labyrinth seal 400 is reduced over the operating life of the labyrinth seal 400 due to the variation in heights amongst the plurality of teeth 434.

Figure 7:
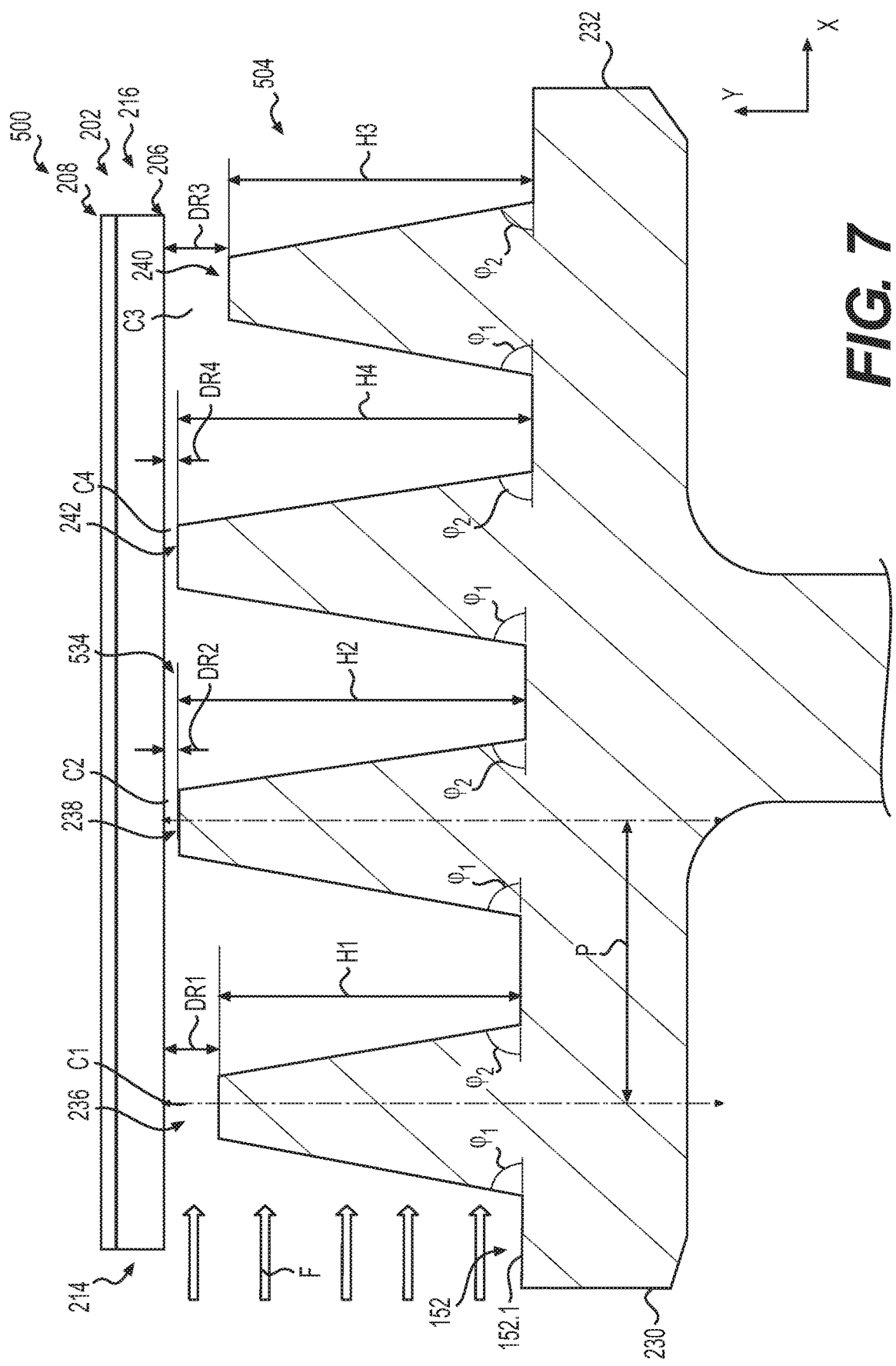
FIG. 7 is a detail cross-sectional view of another exemplary labyrinth seal, taken from the perspective of 3 on FIG. 2, which illustrates variable tooth heights in accordance with another embodiment.

In addition, it will be understood that the labyrinth seal 200 described with regard to FIGS. 1-4 may be configured differently to control leakage during the operating life of the labyrinth seal. In one example, with reference to FIG. 7, a labyrinth seal 500 is shown. As the labyrinth seal 500 includes components that are substantially similar to or the same as the labyrinth seal 200 discussed with regard to FIGS. 1-4, the same reference numerals will be used to denote the same or similar features.

The labyrinth seal 500 includes the stator 202 and a rotor 504. The stator 202 and the rotor 504 cooperate to control or reduce fluid leakage. The stator 202 includes the land 206 and the stator base 208. The stator base 208 is coupled to the annular flange 222 (FIG. 2) so as to be fixed in the axial direction X and the radial direction Y. The rotor 504 is coupled to a rotating portion of the gas turbine engine 100, such as the radial extension 152 of the high pressure shaft 134. The rotor 504 is coupled to the radial extension 152 of the high pressure shaft 134 so as to be spaced apart from the stator 202 in the radial direction Y. The rotor 504 has the first rotor side 230 and the opposite second rotor side 232. In one example, the rotor 504 includes a plurality of teeth 534. In this example, the plurality of teeth 534 are each defined on or integrally formed with the rotor 504; however, in other embodiments, the plurality of teeth 534 may be separately formed, for example, as a sleeve, which is positioned about the radial extension 152 of the high pressure shaft 134 and fixedly coupled to the radial extension 152. The plurality of teeth 534 extend from the first rotor side 230 to the second rotor side 232.

In this example, the plurality of teeth 534 comprise the four teeth 236-242, which are spaced apart along the rotor 504 from the first rotor side 230 to the second rotor side 232 by the pitch P and the first distance D1. In this example, the first tooth 236 is upstream from the remaining teeth 238-242, and is the first to contact the incoming cooling fluid F from the cooling fluid duct 150. The second tooth 238 is downstream from the first tooth 236, and upstream from the teeth 240-242. The fourth tooth 242 is downstream from the second tooth 238, and upstream from the third tooth 240. The third tooth 240 is downstream from the fourth tooth 242, and is between the fourth tooth 242 and the second rotor side 232.

Thus, in this example, the second tooth 238 is between the first tooth 236 and the fourth tooth 242, and the fourth tooth 242 is between the second tooth 238 and the third tooth 240. The third tooth 240 is between the fourth tooth 242 and the second rotor side 232. As the second tooth 238 and the fourth tooth 242 contact and abrade the land 206, the first tooth 236 and the third tooth 240, respectively, define the gap or clearance between the rotor 204 and the land 206. Stated another way, as the land 206 is abraded by the second tooth 238 and the fourth tooth 242, since the second tooth 238 and the fourth tooth 242 have a greater radial height than the first tooth 236 and the third tooth 240, the first tooth 236 and the third tooth 240 define the maximum amount of clearance between the stator 202 and the rotor 504 of the labyrinth seal 500 during a working life of the labyrinth seal 500 or the maximum amount of clearance when the labyrinth seal 500 is worn. In this example, the maximum amount of clearance is about 0.0005 inches to about 0.0015 inches, and in this example, is about 0.001 inches. Once the rub depth is formed in the land 206, during steady state operations, the second tooth 238 and the fourth tooth 242 are also spaced apart from the land 206 by the maximum amount of clearance. By reducing the radial heights of the first tooth 236 and the third tooth 240 and increasing the radial heights H2, H4 of the second tooth 238 and the fourth tooth 242 leakage through the labyrinth seal 500 is reduced over the operating life of the labyrinth seal 500 due to the variation in heights amongst the plurality of teeth 534.

Figure 8:
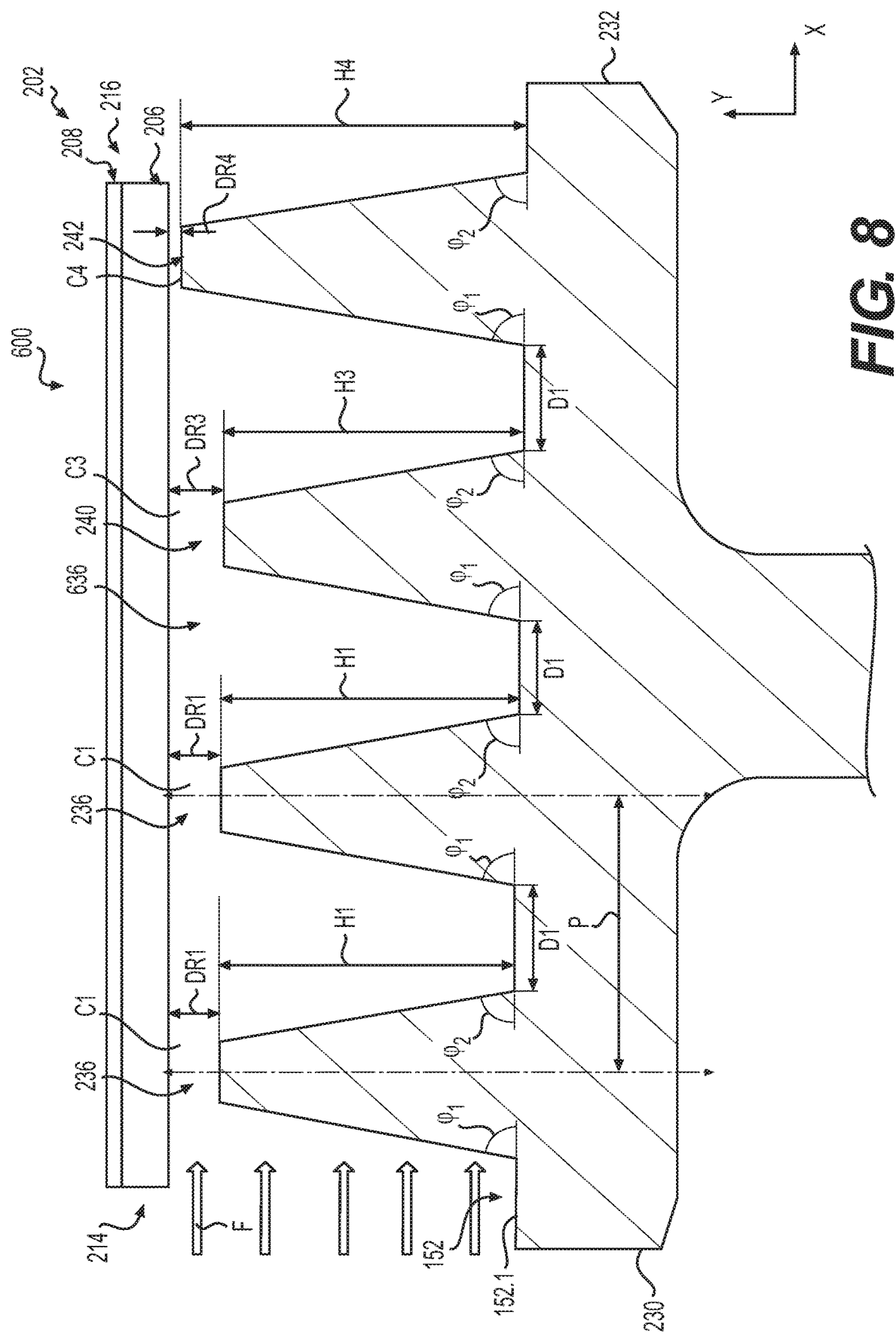
FIG. 8 is a detail cross-sectional view of another exemplary labyrinth seal, taken from the perspective of 3 on FIG. 2, which illustrates variable tooth heights in accordance with another embodiment.

It will be understood that the labyrinth seal 200 described with regard to FIGS. 1-4 may be configured differently to control leakage during the operating life of the labyrinth seal. In one example, with reference to FIG. 8, a labyrinth seal 600 is shown. As the labyrinth seal 600 includes components that are substantially similar to or the same as the labyrinth seal 200 discussed with regard to FIGS. 1-4, the same reference numerals will be used to denote the same or similar features.

The labyrinth seal 600 includes the stator 202 and a rotor 604. The stator 202 and the rotor 604 cooperate to control or reduce fluid leakage. The stator 202 includes the land 206 and the stator base 208. The stator base 208 is coupled to the annular flange 222 (FIG. 2) so as to be fixed in the axial direction X and the radial direction Y. The rotor 604 is coupled to a rotating portion of the gas turbine engine 100, such as the radial extension 152 of the high pressure shaft 134. The rotor 604 is coupled to the radial extension 152 of the high pressure shaft 134 so as to be spaced apart from the stator 202 in the radial direction Y. The rotor 604 has the first rotor side 230 and the opposite second rotor side 232. In one example, the rotor 604 includes a plurality of teeth 634. In this example, the plurality of teeth 634 are each defined on or integrally formed with the rotor 604; however, in other embodiments, the plurality of teeth 634 may be separately formed, for example, as a sleeve, which is positioned about the radial extension 152 of the high pressure shaft 134 and fixedly coupled to the radial extension 152. The plurality of teeth 634 extend from the first rotor side 230 to the second rotor side 232.

In this example, the plurality of teeth 634 comprise four teeth, which in this example, include two of the first tooth 236, the third tooth 240 and the fourth tooth 242. The teeth 236, 236, 240 and 242 are spaced apart along the rotor 604 from the first rotor side 230 to the second rotor side 232 by the pitch P and the first distance D1. In this example, one of the first teeth 236 is upstream from the remaining teeth 236, 240, 242, and is the first to contact the incoming cooling fluid F from the cooling fluid duct 150. A second one of the first teeth 236 is downstream from the first one of the first teeth 236, and upstream from the teeth 240-242. The third tooth 240 is downstream from the second one of the first teeth 236 and is upstream from the fourth tooth 242. The fourth tooth 242 is downstream from the third tooth 240, and is between the third tooth 240 and the second rotor side 232.

Thus, in this example, the labyrinth seal 600 includes two of the first teeth 236, which are upstream from the third tooth 240 and the fourth tooth 242. As the fourth tooth 242 contacts and abrades the land 206, the first teeth 236 and the third tooth 240, respectively, define the gap or clearance between the rotor 604 and the land 206. Stated another way, as the land 206 is abraded by the fourth tooth 242, since the fourth tooth 242 has a greater radial height than the first teeth 236 and the third tooth 240, the first teeth 236 and the third tooth 240 define the maximum amount of clearance between the stator 202 and the rotor 604 of the labyrinth seal 600 during a working life of the labyrinth seal 600 or the maximum amount of clearance when the labyrinth seal 600 is worn. In this example, the maximum amount of clearance is about 0.0005 inches to about 0.0015 inches, and in this example, is about 0.001 inches. Once the rub depth is formed in the land 206, during steady state operations, the fourth tooth 242 is also spaced apart from the land 206 by the maximum amount of clearance. By reducing the radial heights of the first teeth 236 and the third tooth 240 and increasing the radial height H4 of the fourth tooth 242 leakage through the labyrinth seal 600 is reduced over the operating life of the labyrinth seal 600 due to the variation in heights amongst the plurality of teeth 634.

Figure 9:
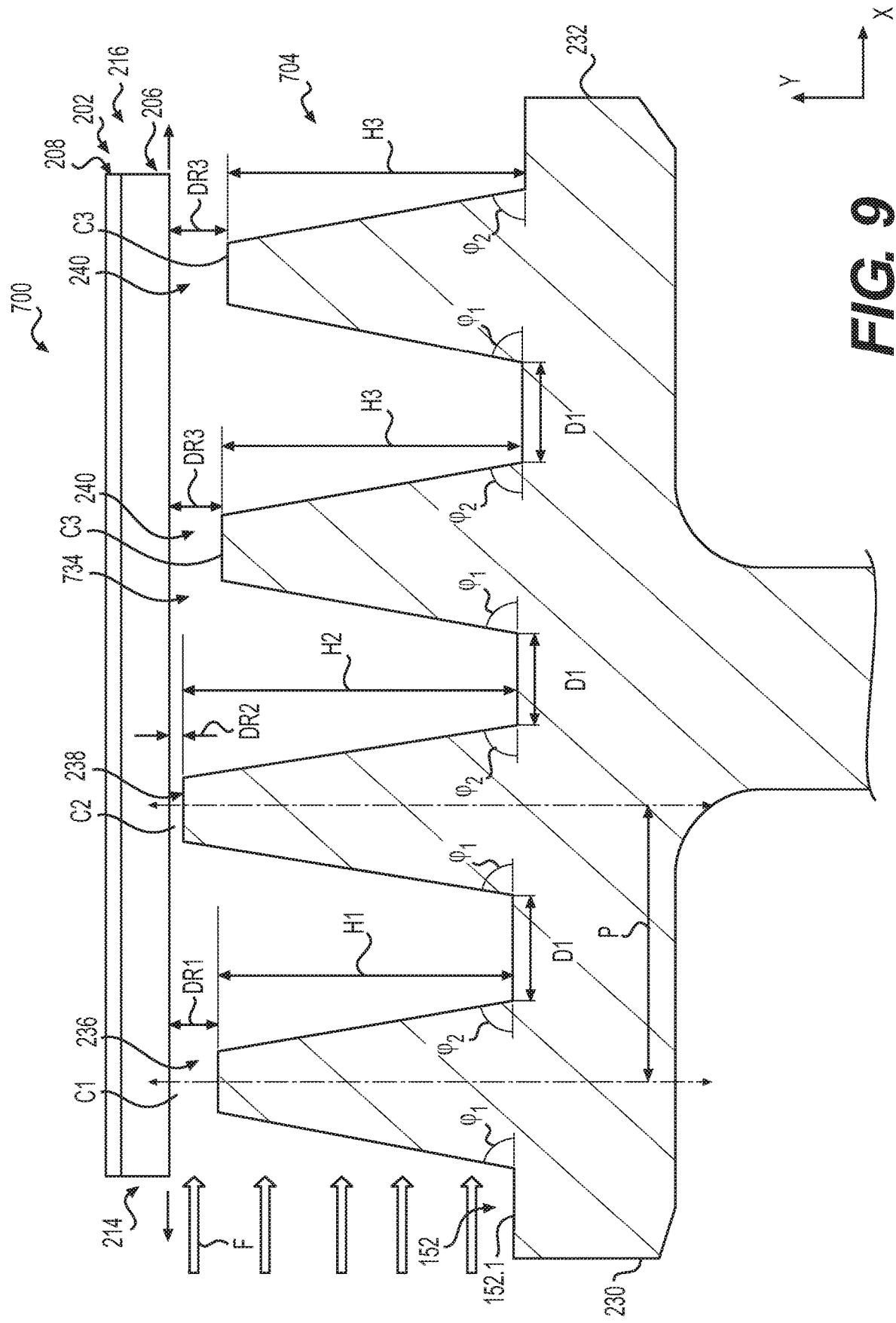
FIG. 9 is a detail cross-sectional view of another exemplary labyrinth seal, taken from the perspective of 3 on FIG. 2, which illustrates variable tooth heights in accordance with another embodiment.

As a further example, it will be understood that the labyrinth seal 200 described with regard to FIGS. 1-4 may be configured differently to control leakage during the operating life of the labyrinth seal. In one example, with reference to FIG. 9, a labyrinth seal 700 is shown. As the labyrinth seal 700 includes components that are substantially similar to or the same as the labyrinth seal 200 discussed with regard to FIGS. 1-4, the same reference numerals will be used to denote the same or similar features.

The labyrinth seal 700 includes the stator 202 and a rotor 704. The stator 202 and the rotor 704 cooperate to control or reduce fluid leakage. The stator 202 includes the land 206 and the stator base 208. The stator base 208 is coupled to the annular flange 222 (FIG. 2) so as to be fixed in the axial direction X and the radial direction Y. The rotor 704 is coupled to a rotating portion of the gas turbine engine 100, such as the radial extension 152 of the high pressure shaft 134. The rotor 704 is coupled to the radial extension 152 of the high pressure shaft 134 so as to be spaced apart from the stator 202 in the radial direction Y. The rotor 704 has the first rotor side 230 and the opposite second rotor side 232. In one example, the rotor 704 includes a plurality of teeth 734. In this example, the plurality of teeth 734 are each defined on or integrally formed with the rotor 704; however, in other embodiments, the plurality of teeth 734 may be separately formed, for example, as a sleeve, which is positioned about the radial extension 152 of the high pressure shaft 134 and fixedly coupled to the radial extension 152. The plurality of teeth 734 extend from the first rotor side 230 to the second rotor side 232.

In this example, the plurality of teeth 734 comprise four teeth, which in this example, include the first tooth 236, the second tooth 238 and two of the third tooth 240. The teeth 236, 238, 240 and 240 are spaced apart along the rotor 704 from the first rotor side 230 to the second rotor side 232 by the pitch P and the first distance D1. In this example, the first tooth 236 is upstream from the remaining teeth 238, 240, 240, and is the first to contact the incoming cooling fluid F from the cooling fluid duct 150. The second tooth 238 is downstream from the first tooth 236, and upstream from a first one of the third teeth 240. The first one of the third teeth 240 is upstream from a second one of the third teeth 240. The second one of the first teeth 236 is downstream from the first one of the third teeth 240, and is between the first one of the third teeth 240 and the second rotor side 232.

Thus, in this example, the labyrinth seal 700 includes two of the third teeth 240, which are downstream from the second tooth 238. As the second tooth 238 contacts and abrades the land 206, the first tooth 236 and the third teeth 240, respectively, define the gap or clearance between the rotor 204 and the land 206. Stated another way, as the land 206 is abraded by the second tooth 238, since the second tooth 238 has a greater radial height than the first tooth 236 and the third teeth 240, the first tooth 236 and the third teeth 240 define the maximum amount of clearance between the stator 202 and the rotor 704 of the labyrinth seal 200 during a working life of the labyrinth seal 700 or the maximum amount of clearance when the labyrinth seal 700 is worn. In this example, the maximum amount of clearance is about 0.0005 inches to about 0.0015 inches, and in this example, is about 0.001 inches. Once the rub depth is formed in the land 206, during steady state operations, the second tooth 238 is also spaced apart from the land 206 by the maximum amount of clearance. By reducing the radial heights of the first tooth 236 and the third teeth 240 and increasing the radial height H2 of the second tooth 238 leakage through the labyrinth seal 700 is reduced over the operating life of the labyrinth seal 700 due to the variation in heights amongst the plurality of teeth 734.

Figure 10:
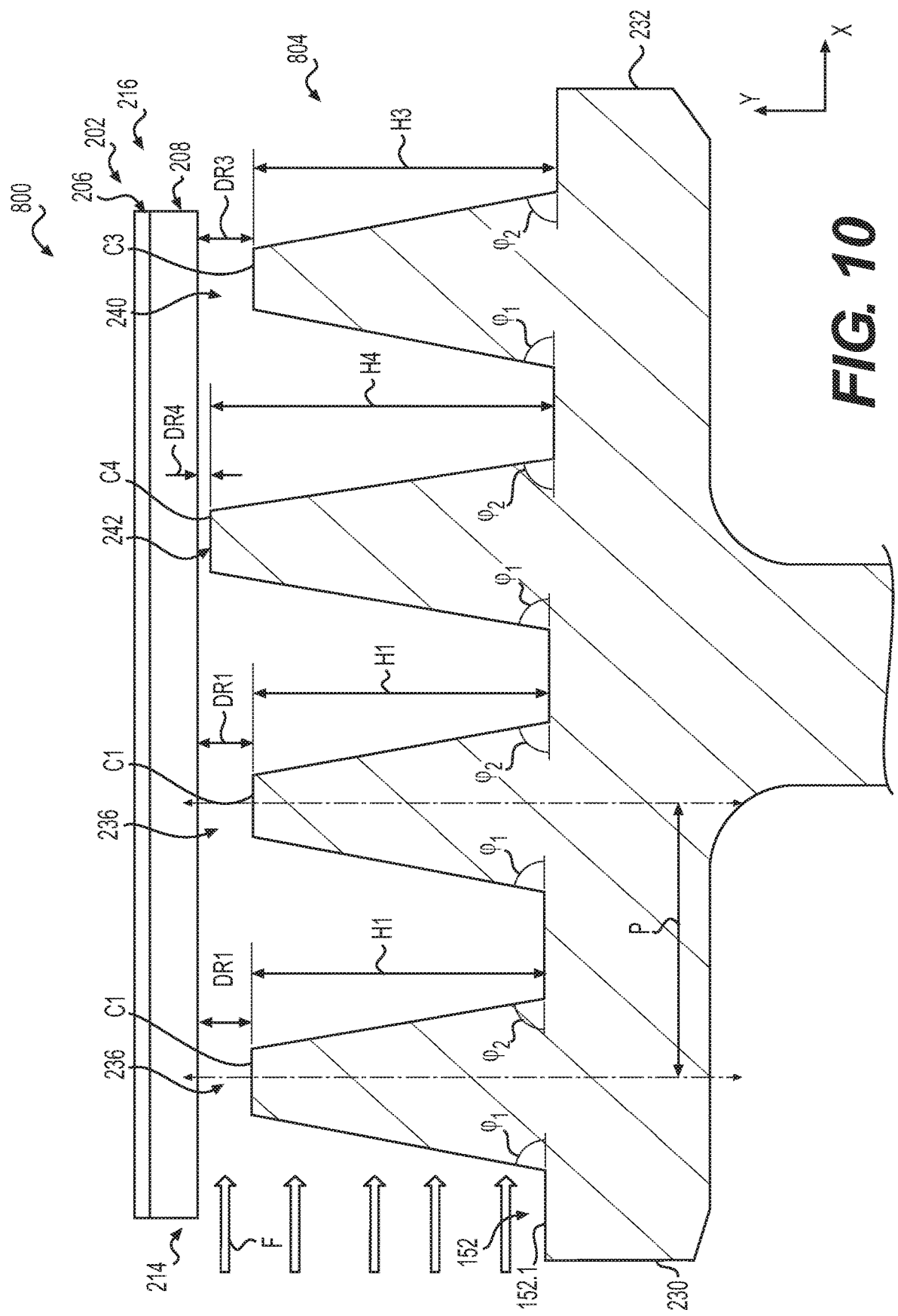
FIG. 10 is a detail cross-sectional view of another exemplary labyrinth seal, taken from the perspective of 3 on FIG. 2, which illustrates variable tooth heights in accordance with another embodiment.

It will be understood that the labyrinth seal 200 described with regard to FIGS. 1-4 may be configured differently to control leakage during the operating life of the labyrinth seal. In one example, with reference to FIG. 10, a labyrinth seal 800 is shown. As the labyrinth seal 800 includes components that are substantially similar to or the same as the labyrinth seal 200 discussed with regard to FIGS. 1-4, the same reference numerals will be used to denote the same or similar features.

The labyrinth seal 800 includes the stator 202 and a rotor 804. The stator 202 and the rotor 804 cooperate to control or reduce fluid leakage. The stator 202 includes the land 206 and the stator base 208. The stator base 208 is coupled to the annular flange 222 (FIG. 2) so as to be fixed in the axial direction X and the radial direction Y. The rotor 804 is coupled to a rotating portion of the gas turbine engine 100, such as the radial extension 152 of the high pressure shaft 134. The rotor 804 is coupled to the radial extension 152 of the high pressure shaft 134 so as to be spaced apart from the stator 202 in the radial direction Y. The rotor 804 has the first rotor side 230 and the opposite second rotor side 232. In one example, the rotor 804 includes a plurality of teeth 834. In this example, the plurality of teeth 834 are each defined on or integrally formed with the rotor 804; however, in other embodiments, the plurality of teeth 834 may be separately formed, for example, as a sleeve, which is positioned about the radial extension 152 of the high pressure shaft 134 and fixedly coupled to the radial extension 152. The plurality of teeth 834 extend from the first rotor side 230 to the second rotor side 232.

In this example, the plurality of teeth 834 comprise four teeth, which in this example, include two of the first tooth 236, the fourth tooth 242 and the third tooth 240. The teeth 236, 236, 242 and 240 are spaced apart along the rotor 804 from the first rotor side 230 to the second rotor side 232 by the pitch P and the first distance D1. In this example, one of the first teeth 236 is upstream from the remaining teeth 236, 242, 240, and is the first to contact the incoming cooling fluid F from the cooling fluid duct 150. A second one of the first teeth 236 is downstream from the first one of the first teeth 236, and upstream from the teeth 242, 240. The fourth tooth 242 is downstream from the second one of the first teeth 236 and is upstream from the third tooth 240. The third tooth 240 is downstream from the fourth tooth 242, and is between the fourth tooth 242 and the second rotor side 232.

Thus, in this example, the labyrinth seal 800 includes two of the first teeth 236, which are upstream from the fourth tooth 242 and the third tooth 240. The fourth tooth 242 is between the second one of the first teeth 236 and the third tooth 240. As the fourth tooth 242 contacts and abrades the land 206, the first teeth 236 and the third tooth 240, respectively, define the gap or clearance between the rotor 804 and the land 206. Stated another way, as the land 206 is abraded by the fourth tooth 242, since the fourth tooth 242 has a greater radial height than the first teeth 236 and the third tooth 240, the first teeth 236 and the third tooth 240 define the maximum amount of clearance between the stator 202 and the rotor 804 of the labyrinth seal 800 during a working life of the labyrinth seal 800 or the maximum amount of clearance when the labyrinth seal 800 is worn. In this example, the maximum amount of clearance is about 0.0005 inches to about 0.0015 inches, and in this example, is about 0.001 inches. Once the rub depth is formed in the land 206, during steady state operations, the fourth tooth 242 is also spaced apart from the land 206 by the maximum amount of clearance. By reducing the radial heights of the first teeth 236 and the third tooth 240 and increasing the radial height H4 of the fourth tooth 242 leakage through the labyrinth seal 800 is reduced over the operating life of the labyrinth seal 800 due to the variation in heights amongst the plurality of teeth 834.

Figure 11:
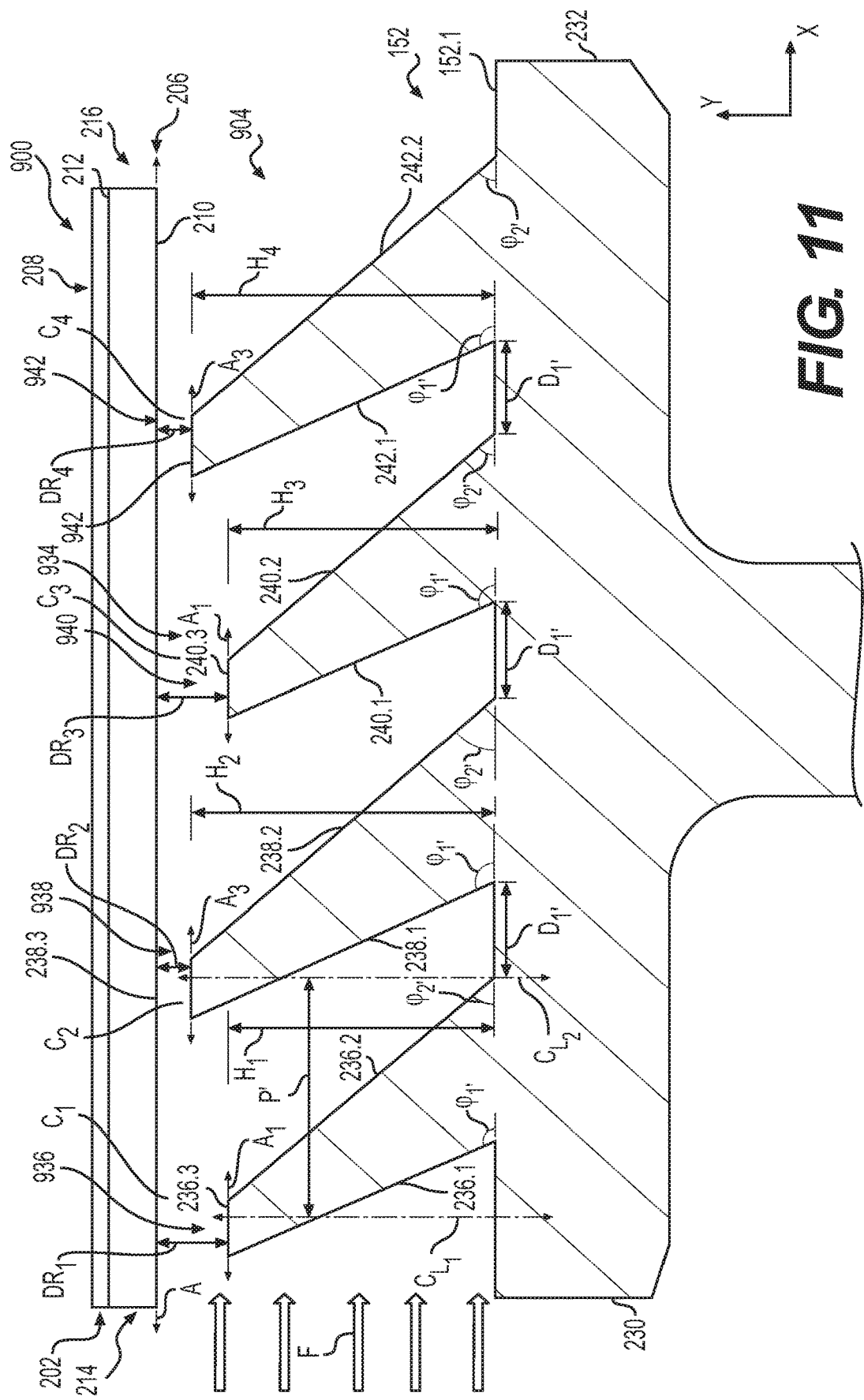
FIG. 11 is a detail cross-sectional view of another exemplary labyrinth seal, taken from the perspective of 3 on FIG. 2, which illustrates variable tooth heights in accordance with another embodiment.

It will be understood that the labyrinth seal 200 described with regard to FIGS. 1-4 may be configured differently to control leakage during the operating life of the labyrinth seal. In one example, with reference to FIG. 11, a labyrinth seal 900 is shown. As the labyrinth seal 900 includes components that are substantially similar to or the same as the labyrinth seal 200 discussed with regard to FIGS. 1-4, the same reference numerals will be used to denote the same or similar features.

The labyrinth seal 900 includes the stator 202 and a rotor 904. The stator 202 and the rotor 904 cooperate to control or reduce fluid leakage. The stator 202 includes the land 206 and the stator base 208. The stator base 208 is coupled to the annular flange 222 (FIG. 2) so as to be fixed in the axial direction X and the radial direction Y. The rotor 904 is coupled to a rotating portion of the gas turbine engine 100, such as the radial extension 152 of the high pressure shaft 134. The rotor 904 is coupled to the radial extension 152 of the high pressure shaft 134 so as to be spaced apart from the stator 202 in the radial direction Y. The rotor 904 has the first rotor side 230 and the opposite second rotor side 232. In one example, the rotor 904 includes a plurality of teeth 934. In this example, the plurality of teeth 934 are each defined on or integrally formed with the rotor 904; however, in other embodiments, the plurality of teeth 934 may be separately formed, for example, as a sleeve, which is positioned about the radial extension 152 of the high pressure shaft 134 and fixedly coupled to the radial extension 152. The plurality of teeth 934 extend from the first rotor side 230 to the second rotor side 232.

In this example, the plurality of teeth 934 comprise four teeth 936-942, which are spaced apart along the rotor 904 from the first rotor side 230 to the second rotor side 232. Each tooth 936-942 is integrally formed with the radial extension 152, and thus, may comprise the same metal or metal alloy as the high pressure shaft 134. In one example, each tooth 936-942 is formed by forging each tooth 936-942 on the radial extension 152 of the high pressure shaft 134.

In this example, the first tooth 936 is upstream from the remaining teeth 938-942, and is the first to contact the incoming cooling fluid F from the cooling fluid duct 150. The first tooth 936 has the first side 236.1, the second side 236.2 and the first tip 236.3. The first side 236.1 is opposite the second side 236.2, and the first tip 236.3 interconnects the first side 236.1 and the second side 236.2. It should be noted that the first tip 236.3 may interconnect the first side 236.1 and the second side 236.2 via one or more rounded edges. The first side 236.1 is in fluid communication with the incoming cooling fluid F. The first side 236.1 extends upwardly from the surface 152.1 of the radial extension 152 at an angle φ1'. In this example, φ1' is generally greater than 90 degrees, and in this example, φ1' ranges from about 95 degrees to about 150 degrees. The second side 236.2 is adjacent to or next to the second tooth 238. The second side 236.2 may be spaced apart from the second tooth 238 along the surface 152.1 of the radial extension 152 by a first distance D1'. In one example, the first distance D1' is about 10% to about 90% of a pitch P' of the plurality of teeth 934. As shown, the pitch P' is defined between the centerline CL1 of the first tip 236.3 and the centerline CL2 of the second tip 238.3 of the second tooth 938. It should be noted that a pitch between a centerline of the second tip 238.3 and a centerline of a third tip 240.3 of the third tooth 940 and a pitch between a centerline of the third tip 240.3 and a centerline of a fourth tip 242.3 of the fourth tooth 942 in this example, is substantially the same as the pitch P' between the centerline CL1' of the first tip 236.3 and the centerline CL2' of the second tip 238.3 of the second tooth 938. Stated another way, in this example, each tooth of the plurality of teeth 934 are separated by the substantially same pitch P'. In one example, the pitch P' ranges from about 0.075 inches (in.) to about 0.3 inches (in.). The second side 236.2 extends upwardly from the surface 152.1 of the radial extension 152 at an angle φ2'. In this example, φ2' is generally less than 90 degrees, and in this example, φ2' ranges from about 30 degrees to about 85 degrees. Thus, in this example, φ2' is different than φ1'. Each of φ1' and φ2' are included angles between the first side 236.1 and the surface 152.1 and the second side 236.2 and the surface 152.1, respectively. By having the angle φ1' greater than 90 degrees and φ2' less than 90 degrees, each tooth 936-942 has a forward lean or is inclined in a direction toward the flow of cooling fluid F.

The first tip 236.3 extends along the axis A1, which is substantially parallel to the axis A of the land 206. In one example, the first tip 236.3 is positioned at the first radial height H1 from the surface 152.1 of the radial extension 152. The first radial height H1 is generally selected so that the first tip 236.3 is spaced the first radial distance DR1 apart from the first surface 210 of the land 206. Stated another way, the first clearance C1 is defined between the first tip 236.3 of the first tooth 236 and the first surface 210 of the land 206, and the first clearance C1 is equal to the first radial distance DR1.

The second tooth 938 is upstream from the remaining teeth 940-942, and is downstream from the first tooth 936. The second tooth 938 has the first side 238.1, the second side 238.2 and the third side or second tip 238.3. The first side 238.1 is opposite the second side 238.2, and the second tip 238.3 interconnects the first side 238.1 and the second side 238.2. It should be noted that the second tip 238.3 may interconnect the first side 238.1 and the second side 238.2 via one or more rounded edges. The first side 238.1 is spaced apart from the second side 236.2 of the first tooth 236. The first side 238.1 extends upwardly from the surface 152.1 of the radial extension 152 at the angle φ1'. The second side 238.2 is adjacent to or next to the third tooth 940. The second side 238.2 may be spaced apart from the third tooth 240 along the surface 152.1 of the radial extension 152 by the first distance D1'. The second side 238.2 extends upwardly from the surface 152.1 of the radial extension 152 at the angle φ2'.

The second tip 238.3 extends along the axis A3, which is substantially parallel to the axis A of the land 206. In one example, the second tip 238.3 is positioned at the second radial height H2. Thus, the second tooth 938 has the second radial height H2. The second radial height H2 is generally selected so that the second tip 238.3 is spaced a second radial distance DR2 apart from the first surface 210 of the land 206. Stated another way, the second clearance C2 is defined between the second tip 238.3 of the second tooth 938 and the first surface 210 of the land 206, and the second clearance C2 is equal to the second radial distance DR2.

The third tooth 940 is upstream from the fourth tooth 942, and is downstream from the second tooth 938. The third tooth 940 has the first side 240.1, the second side 240.2 and the third tip 240.3. The first side 240.1 is opposite the second side 240.2, and the third tip 240.3 interconnects the first side 240.1 and the second side 240.2. It should be noted that the third tip 240.3 may interconnect the first side 240.1 and the second side 240.2 via one or more rounded edges. The first side 240.1 is spaced apart from the second side 238.2 of the second tooth 938. The first side 240.1 extends upwardly from the surface 152.1 of the radial extension 152 at the angle φ1'. The second side 240.2 is adjacent to or next to the fourth tooth 942. The second side 240.2 may be spaced apart from the fourth tooth 942 along the surface 152.1 of the radial extension 152 by the first distance D1'. The second side 240.2 extends upwardly from the surface 152.1 of the radial extension 152 at the angle φ2'.

The third tip 240.3 extends along the axis A1. In one example, the third tip 240.3 is positioned at the third radial height H3. In this example, the third radial height H3 is equal to the first radial height H1. Thus, the first tooth 936 and the third tooth 940 have the same radial height. The third radial height H3 is generally selected so that the third side 240.3 is spaced the third radial distance DR3 apart from the first surface 210 of the land 206. Stated another way, the third clearance C3 is defined between the third tip 240.3 of the third tooth 940 and the first surface 210 of the land 206, and the third clearance C3 is equal to the third radial distance DR3. In this example, the third clearance C3 is equal to the first clearance C1, and the third radial distance DR3 is equal to the first radial distance DR1. Thus, the first tooth 936 and the third tooth 940 have substantially the same radial heights and clearances.

The fourth tooth 942 is downstream from the third tooth 940 and is between the third tooth 940 and the second rotor end 232. The fourth tooth 942 has the first side 242.1, the second side 242.2 and the fourth tip 242.3. The first side 242.1 is opposite the second side 242.2, and the fourth tip 242.3 interconnects the first side 242.1 and the second side 242.2. It should be noted that the fourth tip 242.3 may interconnect the first side 242.1 and the second side 242.2 via one or more rounded edges. The first side 242.1 is spaced apart from the second side 240.2 of the third tooth 940. The first side 242.1 extends upwardly from the surface 152.1 of the radial extension 152 at the angle φ1'. The second side 242.2 is adjacent to or next to the second rotor end 232. The second side 242.2 extends upwardly from the surface 152.1 of the radial extension 152 at the angle φ2'.

The fourth tip 242.3 extends along the axis A3. In one example, the third side 242.3 is positioned at the fourth radial height H4. In this example, the fourth radial height H4 is equal to the second radial height H2, and thus, the second tooth 938 and the fourth tooth 942 have the same radial height. The fourth radial height H4 is generally selected so that the fourth tip 242.3 is spaced a fourth radial distance DR4 apart from the first surface 210 of the land 206. Stated another way, the fourth clearance C4 is defined between the fourth tip 242.3 of the fourth tooth 242 and the first surface 210 of the land 206, and the fourth clearance C4 is equal to the fourth radial distance DR4. In this example, the fourth clearance C4 is equal to the second clearance C2, and the fourth radial distance DR4 is equal to the second radial distance DR2. Thus, the second tooth 938 and the fourth tooth 942 have the same radial heights and clearances.

Thus, in this example, the first tooth 936 and the third tooth 940 have the same radial heights and clearances; and the second tooth 938 and the fourth tooth 942 have the same radial heights and clearances. As the second tooth 938 and the fourth tooth 942 contact and abrade the land 206, the first tooth 936 and the third tooth 940, respectively, define the gap or clearance between the rotor 204 and the land 206. Stated another way, as the land 206 is abraded by the second tooth 938 and the fourth tooth 942, since the second tooth 938 and the fourth tooth 942 have a greater radial height than the first tooth 936 and the third tooth 940, the first tooth 936 and the third tooth 940 define a maximum amount of clearance between the stator 202 and the rotor 904 of the labyrinth seal 900 over a working life of the labyrinth seal 900 or the maximum amount of clearance when the labyrinth seal 900 is worn. In this example, the maximum amount of clearance is about 0.0005 inches to about 0.0015 inches, and in this example, is about 0.001 inches. Once the rub depth is formed in the land 206, during steady state operations, the second tooth 938 and the fourth tooth 942 are also spaced apart from the land 206 by the maximum amount of clearance. By reducing the radial heights of the first tooth 936 and the third tooth 940 and increasing the radial heights H2, H4 of the second tooth 938 and the fourth tooth 942 leakage through the labyrinth seal 900 is reduced over the operating life of the labyrinth seal 900 due to the variation in heights amongst the plurality of teeth 934.

Thus, the labyrinth seals 200, 300, 400, 500, 600, 700, 800, 900 control and reduce leakage of fluid through the labyrinth seals 200, 300, 400, 500, 600, 700, 800, 900 over the working life of the respective labyrinth seal 200, 300, 400, 500, 600, 700, 800, 900. In one example, the labyrinth seals 200, 300, 400, 500, 600, 700, 800, 900 reduce leakage through the respective labyrinth seal 200, 300, 400, 500, 600, 700, 800, 900 by about 50% to about 80% when the respective land 206 is worn due to the operating conditions associated with the gas turbine engine 100. Thus, even when the land 206 of the labyrinth seal 200, 300, 400, 500, 600, 700, 800 is worn or deteriorated due to contact between respective ones of the plurality of teeth 234, 334, 434, 534, 634, 734, 834, 934 and the land 206, the leakage through the labyrinth seal 200, 300, 400, 500, 600, 700, 800, 900 is controlled and reduced due to the reduced radial height of the respective ones of the plurality of teeth 234, 334, 434, 534, 634, 734, 834, 934. By controlling or reducing the leakage of the cooling fluid from the cooling fluid duct 150, the labyrinth seal 200, 300, 400, 500, 600, 700, 800, 900 improves the operating efficiency of the gas turbine engine 100 by reducing a specific fuel consumption of the gas turbine engine 100. In one example, the labyrinth seal 200, 300, 400, 500, 600, 700, 800, 900 reduces cooling fluid flow requirements by about 0.5%, which reduces a specific fuel consumption of the gas turbine engine 100 by about 0.33%.

It should be noted that while the labyrinth seals 200, 300, 400, 500, 600, 700, 800, 900 are described herein with the land 206 and the stator base 208 coupled to the non-rotating portion of the gas turbine engine 100 and the plurality of teeth 234, 334, 434, 534, 634, 734, 834, 934 coupled to the rotating portion of the gas turbine engine 100, it should be noted that in certain instances the plurality of teeth 234, 334, 434, 534, 634, 734, 834, 934 may be coupled to the non-rotating portion of the gas turbine engine 100 and the land 206 and stator base 208 may be coupled to the rotating portion of the gas turbine engine 100. Moreover, it should be noted that while the plurality of teeth 234, 334, 434, 534, 634, 734, 834, 934 are illustrated and described herein as including four teeth, the plurality of teeth 234, 334, 434, 534, 634, 734, 834, 934 may include any number of teeth. Further, it should be noted that the values and dimensions provided herein are merely exemplary, as particular applications of the labyrinth seals 200, 300, 400, 500, 600, 700, 800, 900 may require different dimensions.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A labyrinth seal for a gas turbine engine, comprising:
    a stator configured to be coupled to a non-rotating portion of the gas turbine engine and fixed in an axial direction and a radial direction, the stator including a layer of abradable material extending uniformly in the axial direction from a first stator side to an opposite second stator side; and
    a rotor configured to be coupled to a rotating portion of the gas turbine engine so as to be spaced apart from the stator in the radial direction, the rotor having a first side adapted to receive a fluid flow and an opposite second side, the rotor including a first tooth proximate the first side having a first radial height, a second tooth between the first tooth and the second side, the first tooth having a first tooth side opposite a second tooth side, the first tooth side facing the fluid flow and spaced apart from the first end, the first tooth side extending at an included angle of less than 90 degrees from a surface of the rotor, the second tooth having a second radial height that is less than the first radial height and a third tooth between the first tooth and the second side having a third radial height that is substantially the same as the first radial height, a first clearance between a first tip of the first tooth and the stator in the radial direction is different than a second clearance between a second tip of the second tooth and the stator in the radial direction and a third clearance between a third tip of the third tooth and the stator in the radial direction is substantially the same as the first clearance.

2. The labyrinth seal of claim 1, wherein the third tooth is between a fourth tooth and the second side, the fourth tooth having a fourth radial height that is substantially the same as the second radial height and a fourth clearance between a fourth tip of the fourth tooth and the stator is substantially the same as the second clearance.

3. The labyrinth seal of claim 1, wherein the third tooth is between the second tooth and a fourth tooth, the fourth tooth having a fourth radial height that is substantially the same as the second radial height and a fourth clearance between a fourth tip of the fourth tooth and the stator is substantially the same as the second clearance.

4. The labyrinth seal of claim 1, wherein the first tooth has a second tooth side opposite the first tooth side, which extends at a second angle from a surface of the rotor.

5. The labyrinth seal of claim 4, wherein the second angle is an included angle of less than 90 degrees.

6. The labyrinth seal of claim 1, wherein the first tooth is spaced apart from the second tooth by a first distance, and the first distance is predetermined as a percentage of a value of a pitch of the first tooth and the second tooth.

7. A labyrinth seal for a gas turbine engine, comprising:
a stator configured to be coupled to a non-rotating portion of the gas turbine engine and fixed in an axial direction and a radial direction, the stator including a layer of abradable material extending uniformly in the axial direction from a first stator side to an opposite second stator side; and
a rotor configured to be coupled to a rotating portion of the gas turbine engine so as to be spaced apart from the stator in the radial direction, the rotor having a first side adapted to receive a fluid flow and an opposite second side, the rotor including a first tooth proximate the first side having a first radial height, the first tooth having a first tooth side opposite a second tooth side, the first tooth side facing the fluid flow and spaced apart from the first end, the first tooth side extending at a first angle of less than 90 degrees from a surface of the rotor and the second tooth side extending at a second angle from the surface of the rotor, the first angle and the second angle are included angles and substantially the same, a second tooth between the first tooth and the second side, the second tooth having a second radial height that is less than the first radial height and a third tooth between the first tooth and the second side having a third radial height that is substantially the same as the first radial height, the third tooth is between a fourth tooth and the second side, the fourth tooth having a fourth radial height that is substantially the same as the second radial height, with a first clearance between a first tip of the first tooth and the stator in the radial direction different than a second clearance between a second tip of the second tooth and the stator in the radial direction, a third clearance between a third tip of the third tooth and the stator in the radial direction is substantially the same as the first clearance, and a fourth clearance between a fourth tip of the fourth tooth and the stator is substantially the same as the second clearance.

8. The labyrinth seal of claim 7, wherein the first tooth is spaced apart from the second tooth by a first distance, and the first distance is predetermined as a percentage of a value of a pitch of the first tooth and the second tooth.

9. A labyrinth seal for a gas turbine engine, comprising:
a stator configured to be coupled to a non-rotating portion of the gas turbine engine and fixed in an axial direction and a radial direction, the stator including a layer of abradable material extending uniformly in the axial direction from a first stator side to an opposite second stator side; and
a rotor configured to be coupled to a rotating portion of the gas turbine engine so as to be spaced apart from the stator in the radial direction, the rotor having a first side adapted to receive a fluid flow and an opposite second side, the rotor including a first tooth proximate the first side having a first radial height, a second tooth between the first tooth and the second side, the first tooth having a first tooth side opposite a second tooth side, the first tooth side facing the fluid flow and spaced apart from the first end, the first tooth side extending at an included angle of less than 90 degrees from a surface of the rotor, the second tooth having a second radial height that is less than the first radial height and a third tooth between the first tooth and the second side having a third radial height that is substantially the same as the first radial height, third tooth is between the second tooth and a fourth tooth, the fourth tooth having a fourth radial height that is substantially the same as the second radial height with a first clearance between a first tip of the first tooth and the stator in the radial direction different than a second clearance between a second tip of the second tooth and the stator in the radial direction, a third clearance between a third tip of the third tooth and the stator in the radial direction is substantially the same as the first clearance, and a fourth clearance between a fourth tip of the fourth tooth and the stator is substantially the same as the second clearance.

10. The labyrinth seal of claim 9, wherein the first tooth has a second tooth side opposite the first tooth side, which extends at a second angle from a surface of the rotor and the second angle is substantially the same as the included angle of the first tooth side.

11. The labyrinth seal of claim 10, wherein the second angle is an included angle.

12. The labyrinth seal of claim 9, wherein the first tooth is spaced apart from the second tooth by a first distance, and the first distance is predetermined as a percentage of a value of a pitch of the first tooth and the second tooth.

* * * * *